US012804582B2

United States Patent

(12) United States Patent
Cha et al.

(10) Patent No.: US 12,804,582 B2
(45) Date of Patent: Nov. 17, 2026

(54) METHOD FOR TRANSMITTING AND RECEIVING SIGNAL IN WIRELESS COMMUNICATION SYSTEM, AND APPARATUS SUPPORTING SAME

(71) Applicant: LG ELECTRONICS INC., Seoul (KR)

(72) Inventors: Hyunsu Cha, Seoul (KR); Jaehyung Kim, Seoul (KR); Hyunsoo Ko, Seoul (KR); Hyungtae Kim, Seoul (KR); Suckchel Yang, Seoul (KR); Jiwon Kang, Seoul (KR); Jeongsu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 729 days.

(21) Appl. No.: 18/021,340

(22) PCT Filed: Oct. 18, 2021

(86) PCT No.: PCT/KR2021/014497

§ 371 (c)(1),
(2) Date: Feb. 14, 2023

(87) PCT Pub. No.: WO2022/080992

PCT Pub. Date: Apr. 21, 2022

(65) Prior Publication Data

US 2023/0309050 A1 Sep. 28, 2023

Related U.S. Application Data

(60) Provisional application No. 63/093,047, filed on Oct. 16, 2020.

(51) Int. Cl.
*H04W 64/00* (2009.01)
*H04L 5/00* (2006.01)

(52) U.S. Cl.
CPC .......... *H04W 64/00* (2013.01); *H04L 5/0048* (2013.01)

(58) Field of Classification Search
CPC . H04W 64/00; H04W 64/003; H04W 64/006; H04W 56/006; H04W 4/02;
(Continued)

(56) References Cited

U.S. PATENT DOCUMENTS

2012/0122472 A1 * 5/2012 Krishnamurthy ..... H04L 5/0053 455/456.1
2020/0228381 A1 7/2020 Manolakos et al.
(Continued)

FOREIGN PATENT DOCUMENTS

WO WO-2021036508 A1 * 3/2021 ............ H04W 24/08

OTHER PUBLICATIONS

Intel Corporation "Potential enhancements of NR positioning design," R1-2005879, 3GPP TSG RAN WG1 Meeting #102-e, Aug. 8, 2020.
(Continued)

*Primary Examiner* — Warner Wong
(74) *Attorney, Agent, or Firm* — BRYAN CAVE LEIGHTON PAISNER LLP

(57) ABSTRACT

Various embodiments relate to a next-generation wireless communication system for supporting higher data transmission rates than that of a 4th generation (4G) system. According to various embodiments, a method for transmitting and receiving a signal in a wireless communication system, and an apparatus supporting same can be provided, and various other embodiments can also be provided.

12 Claims, 16 Drawing Sheets

(58) Field of Classification Search
CPC ........ H04W 4/021; H04W 4/029; H04L 5/00; H04L 5/003; H04L 5/0048; H04L 4/003; H04L 4/0048; H04B 7/2693; H04B 7/18556; H04B 17/27
See application file for complete search history.

(56) References Cited

U.S. PATENT DOCUMENTS

| | | | | |
|---|---|---|---|---|
| 2021/0352613 | A1* | 11/2021 | Yoon | H04W 56/001 |
| 2022/0053461 | A1* | 2/2022 | Bao | H04W 72/1263 |
| 2022/0069958 | A1* | 3/2022 | Choi | H04L 5/0005 |
| 2022/0095265 | A1* | 3/2022 | Cha | H04W 64/006 |
| 2022/0268873 | A1* | 8/2022 | Shi | H04W 16/28 |
| 2022/0272731 | A1* | 8/2022 | Cha | H04W 76/28 |
| 2023/0041767 | A1* | 2/2023 | Manolakos | H04W 76/28 |
| 2023/0112173 | A1* | 4/2023 | Hargis | C04B 28/08 106/722 |
| 2023/0254811 | A1* | 8/2023 | Wang | H04W 64/006 370/330 |
| 2023/0328680 | A1* | 10/2023 | Cha | H04W 24/10 |
| 2023/0388072 | A1* | 11/2023 | Munier | H04W 76/20 |
| 2025/0287350 | A1* | 9/2025 | Manolakos | H04L 5/0048 |

OTHER PUBLICATIONS

Moderator (Catt) "FL Summary #5 for potential positioning enhancements," R1-2007343, 3GPP TSG RAN WG1 Meeting #102-e, Aug. 28, 2020.

Huawei, et al. "Positioning enhanement in Rel-17," R1-20052353, 3GPP TSG RAN WG1 Meeting #102-e, Aug. 8, 2020.

Vivo, "Discussion on potential positioning enhansements," R1-2005381, 3GPP TSG RAN WG1 Meeting #102-e, Aug. 8, 2020.

Intel Corporation (2020), "Potential Enhancements for NR Positioning," 3GPP TSG RAN WG1 Meeting #101-E, e-Meeting, May 25th-Jun. 5, 2020, R1-2003769, pp. 1-7.

3GPP (2020), "3rd Generation Partnership Project; Technical Specification Group Radio Access Network; NR; Physical layer procedures for data (Release 16)," Sep. 2020, 3GPP TS 38.214 v16.3.0 (Sep. 2020), 166 pages.

Mitsubishi Electric (2019), "View on DL reference signal designs for NR positioning," 3GPP TSG RAN WG1 Meeting #98b, Chongqing, China, Oct. 14-20, 2019, R1-1911199, 9 pages.

* cited by examiner (a)

(b)

| Example#1 | Frequency layers | TRPs | PRS resource sets |
|---|---|---|---|
| Code point | 1000 | 10100000 | 10 |

| Example#2 | Frequency layers/TRPs/PRS resource sets |
|---|---|
| Code point | 110100.... |

METHOD FOR TRANSMITTING AND RECEIVING SIGNAL IN WIRELESS COMMUNICATION SYSTEM, AND APPARATUS SUPPORTING SAME

This application is the National Stage filing under 35 U.S.C. 371 of International Application No. PCT/KR2021/014497 filed on Oct. 18, 2021, which claims priority to U.S. Provisional Application No. 63/093,047 filed on Oct. 16, 2020, the contents of which are all hereby incorporated by reference herein in their entirety.

TECHNICAL FIELD

Various embodiments are related to a wireless communication system.

BACKGROUND

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

DISCLOSURE

Technical Problem

Various embodiments may provide a method and apparatus for transmitting and receiving a signal in a wireless communication system.

Various embodiments may provide a positioning method based on timing measurement and an apparatus supporting the same.

It will be appreciated by persons skilled in the art that the objects that could be achieved with the various embodiments are not limited to what has been particularly described hereinabove and the above and other objects that the various embodiments could achieve will be more clearly understood from the following detailed description.

Technical Solution

Various embodiments may provide a method of transmitting and receiving a signal in a wireless communication system and apparatus for supporting the same.

According to various embodiments, a method performed by a user equipment (UE) in a wireless communication system may be provided.

According to various embodiments, the method may include: receiving positioning reference signal (PRS) configuration information; and receiving one or more PRSs based on the PRS configuration information.

According to various embodiments, based on reception of information on triggering an aperiodic PRS, the one or more PRSs may be aperiodically received.

According to various embodiments, the PRS configuration information may include: information on positioning frequency layers; information on a specific transmission and reception point (TRP) among a plurality of first TRPs;

information on PRS resource sets of the specific TRP; and information on PRS resources of the specific TRP.

According to various embodiments, the information on the PRS resource sets of the specific TRP and the information on the PRS resources of the specific TRP may be included in a higher layer parameter for assistance data related to the specific TRP.

According to various embodiments, the higher layer parameter may further include information for configuring a triggering state of the aperiodic PRS.

According to various embodiments, the information on triggering the aperiodic PRS may be received in downlink control information (DCI).

According to various embodiments, the information on triggering the aperiodic PRS may be related to the triggering state of the aperiodic PRS configured based on the information for configuring the triggering state of the aperiodic PRS.

According to various embodiments, the DCI may include: information indicating a specific positioning frequency layer among the positioning frequency layers; information indicating the specific TRP among the plurality of first TRPs; information indicating a specific PRS resource set among the PRS resource sets; and information indicating a specific PRS resource among the PRS resources.

According to various embodiments, the information indicating the specific positioning frequency layer among the positioning frequency layers, the information indicating the specific TRP among the plurality of first TRPs, the information indicating the specific PRS resource set among the PRS resource sets, and the information indicating the specific PRS resource among the PRS resources may be indicated by different bit fields.

According to various embodiments, the information indicating the specific positioning frequency layer among the positioning frequency layers, the information indicating the specific TRP among the plurality of first TRPs, the information indicating the specific PRS resource set among the PRS resource sets, and the information indicating the specific PRS resource among the PRS resources may be indicated by one integrated bit field.

According to various embodiments, the specific TRP may be a plurality of second TRPs included in the plurality of first TRPs.

According to various embodiments, for each of the plurality of second TRPs, an offset for triggering the aperiodic PRS may be configured in units of at least one of symbols or slots.

According to various embodiments, a measurement for positioning may be obtained based on the one or more PRSs, According to various embodiments, based on reception of information for configuring a report on the measurement through radio resource control (RRC) signaling, the measurement may be reported.

According to various embodiments, the information for configuring the report on the measurement may include: information on an identifier for a positioning reporting configuration; information on reporting behavior in a time domain; information on resolution of reporting contents; information on a UE transmission/reception beam or a UE panel; information on the reporting contents; information on a timing error; and information on the one or more PRSs used to obtain the reporting contents.

According to various embodiments, a UE configured to operate in a wireless communication system may be provided.

According to various embodiments, the UE may include: a transceiver; and at least one processor connected to the transceiver.

According to various embodiments, the at least one processor may be configured to receive PRS configuration information; and receive one or more PRSs based on the PRS configuration information.

According to various embodiments, based on reception of information on triggering an aperiodic PRS, the one or more PRSs may be aperiodically received.

According to various embodiments, the PRS configuration information may include: information on positioning frequency layers; information on a specific TRP among a plurality of first TRPs; information on PRS resource sets of the specific TRP; and information on PRS resources of the specific TRP.

According to various embodiments, the information on the PRS resource sets of the specific TRP and the information on the PRS resources of the specific TRP may be included in a higher layer parameter for assistance data related to the specific TRP.

According to various embodiments, the higher layer parameter may further include information for configuring a triggering state of the aperiodic PRS.

According to various embodiments, the information on triggering the aperiodic PRS may be received in DCI.

According to various embodiments, the information on triggering the aperiodic PRS may be related to the triggering state of the aperiodic PRS configured based on the information for configuring the triggering state of the aperiodic PRS.

According to various embodiments, the specific TRP may be a plurality of second TRPs included in the plurality of first TRPs.

According to various embodiments, for each of the plurality of second TRPs, an offset for triggering the aperiodic PRS may be configured in units of at least one of symbols or slots.

According to various embodiments, the at least one processor may be configured to communicate with at least one of a mobile terminal, a network, or an autonomous vehicle other than a vehicle including the UE.

According to various embodiments, a method performed by a base station (BS) in a wireless communication system may be provided.

According to various embodiments, the method may include: transmitting PRS configuration information; and transmitting one or more PRSs related to the PRS configuration information.

According to various embodiments, based on transmission of information on triggering an aperiodic PRS, the one or more PRSs may be aperiodically transmitted.

According to various embodiments, a BS configured to operate in a wireless communication system may be provided.

According to various embodiments, the BS may include: a transceiver; and at least one processor connected to the transceiver, According to various embodiments, the at least one processor may be configured to: transmit PRS configuration information; and transmit one or more PRSs related to the PRS configuration information.

According to various embodiments, based on transmission of information on triggering an aperiodic PRS, the one or more PRSs may be aperiodically transmitted.

According to various embodiments, an apparatus configured to operate in a wireless communication system may be provided.

According to various embodiments, the apparatus may include: at least one processor; and at least one memory operably coupled to the at least one processor and configured to store one or more instructions that, based on execution, cause the at least one processor to perform operations.

According to various embodiments, the operations may include: receiving PRS configuration information; and receiving one or more PRSs based on the PRS configuration information.

According to various embodiments, based on reception of information on triggering an aperiodic PRS, the one or more PRSs may be aperiodically received.

According to various embodiments, a non-transitory processor-readable medium configured to store one or more instructions that cause at least one processor to perform operations may be provided.

According to various embodiments, the operations may include: receiving PRS configuration information; and receiving one or more PRSs based on the PRS configuration information.

According to various embodiments, based on reception of information on triggering an aperiodic PRS, the one or more PRSs may be aperiodically received.

It will be understood by those skilled in the art that the above-described embodiments are merely part of various embodiments of the present disclosure, and various modifications and alternatives could be developed from the following technical features of the present disclosure.

Advantageous Effects

According to various embodiments, a signal may be effectively transmitted and received in a wireless communication system.

According to various embodiments, positioning may be effectively performed in a wireless communication system.

According to various embodiments, an aperiodic (AP) positioning reference signal (PRS) may be effectively supported.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

BRIEF DESCRIPTION OF THE DRAWINGS

The accompanying drawings are provided to help understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

DETAILED DESCRIPTION

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP System

1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
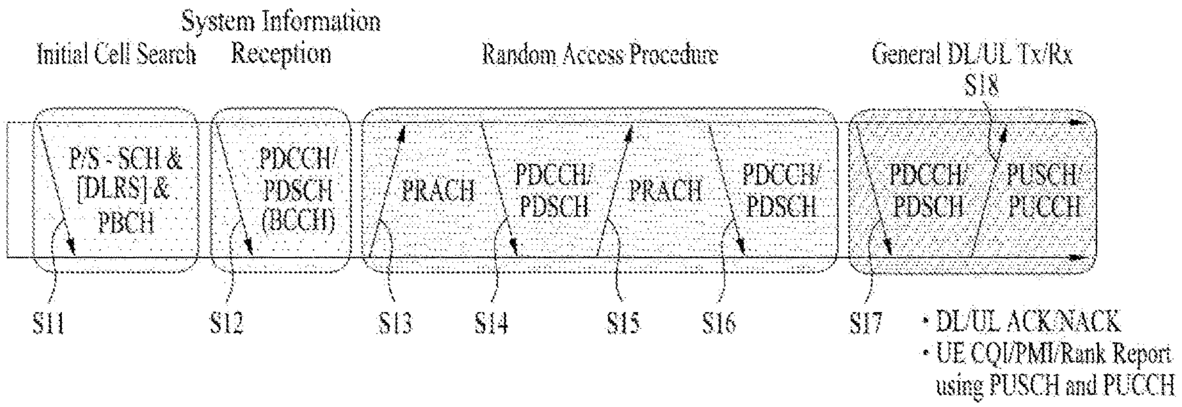
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a physical uplink shared channel (PUSCH) by using scheduling information in the RAR (S15), and perform a contention resolution procedure including reception of a PDCCH signal and a PDSCH signal corresponding to the PDCCH signal (S16).

Aside from the above 4-step random access procedure (4-step RACH procedure or type-1 random access procedure), when the random access procedure is performed in two steps (2-step RACH procedure or type-2 random access procedure), steps S13 and S15 may be performed as one UE transmission operation (e.g., an operation of transmitting message A (MsgA) including a PRACH preamble and/or a PUSCH), and steps S14 and S16 may be performed as one BS transmission operation (e.g., an operation of transmitting message B (MsgB) including an RAR and/or contention resolution information)

After the above procedure, the UE may receive a PDCCH and/or a PDSCH from the BS (S17) and transmit a PUSCH and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Physical Resources

Figure 2:
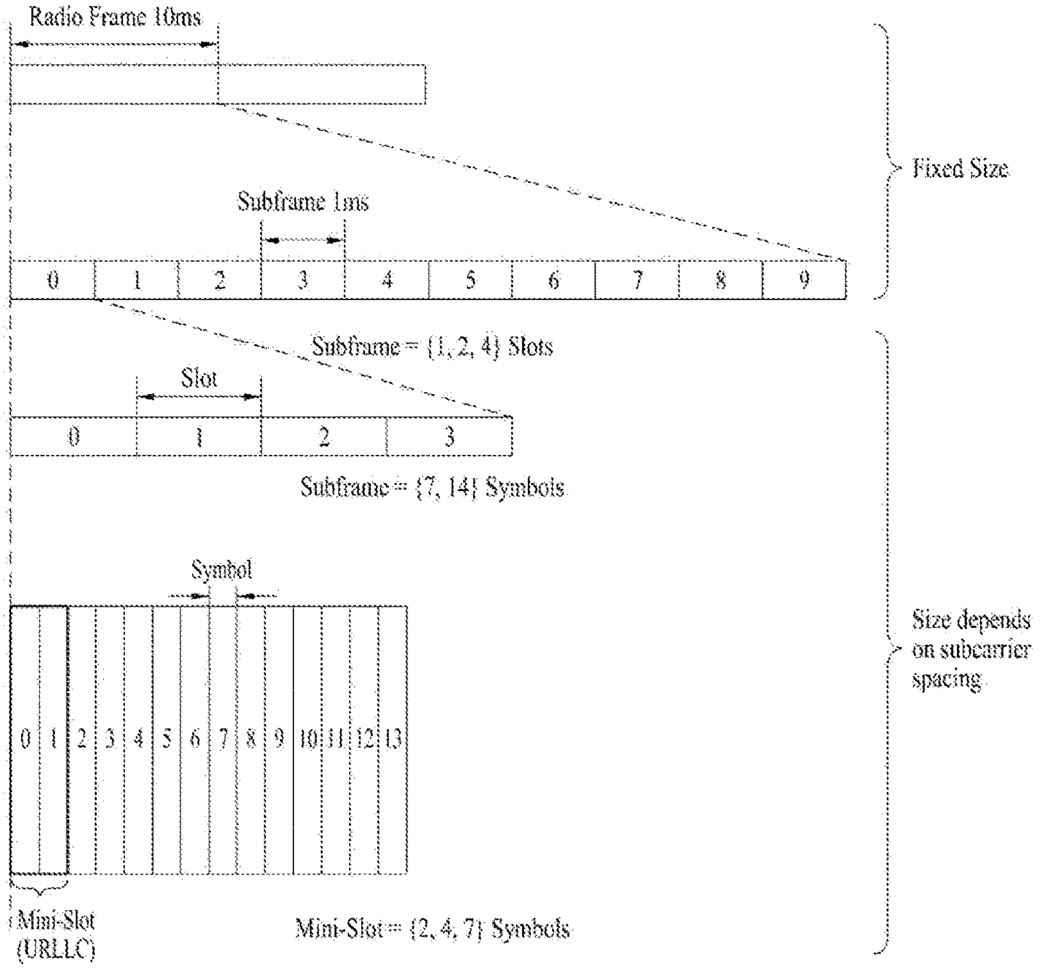
FIG. 2 is a diagram illustrating a radio frame structure in a new radio access technology (NR) system to which various embodiments are applicable.

FIG. 2 illustrates an NR system based radio frame structure which can be used for various embodiments.

The NR system may support multiple numerologies. A numerology may be defined by a subcarrier spacing (SCS) and a cyclic prefix (CP) overhead. Multiple SCSs may be derived by scaling a default SCS by an integer N (or μ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, μ and a CP are obtained from RRC parameters provided by the BS.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, Tc=1/(Δfmax*Nf) where Δfmax=480*103 Hz and a value Nf related to a fast Fourier transform (FFT) size or an inverse fast Fourier transform (IFFT) size is given as Nf=4096. Tc and Ts which is an LTE-based time unit and sampling time, given as Ts=1/((15 kHz)*2048) are placed in the following relationship: Ts/Tc=64. DL and UL transmissions are organized into (radio) frames each having a duration of Tf=(Δfmax*Nf/100)*Tc=10 ms. Each radio frame includes 10 subframes each having a duration of Tsf=(Δfmax*Nf/1000)*Tc=1 ms. There may exist one set of frames for UL and one set of frames for DL. For a numerology μ, slots are numbered with nμs∈{0, . . . , Nslot,μsubframe−1} in an increasing order in a subframe, and with nμs,f∈{0, . . . , Nslot,μframe−1} in an increasing order in a radio frame. One slot includes Nμsymb consecutive OFDM symbols, and Nμsymb depends on a CP. The start of a slot nμs in a subframe is aligned in time with the start of an OFDM symbol nμs*Nμsymb in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, Nslotsymb represents the number of symbols in a slot, Nframe,μslot represents the number of slots in a frame, and Nsubframe,μslot represents the number of slots in a subframe.

In the NR system to which various embodiments are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 6, one subframe may include four slots. One subframe={1, 2, 4} slots in FIG. 2, which is exemplary, and the number of slot(s) which may be included in one subframe is defined as listed in Table 6 or Table 7.

Further, a mini-slot may include 2, 4 or 7 symbols, fewer symbols than 2, or more symbols than 7.

Regarding physical resources in the NR system, antenna ports, a resource grid, resource elements (REs), resource blocks (RBs), carrier parts, and so one may be considered. The physical resources in the NR system will be described below in detail.

An antenna port is defined such that a channel conveying a symbol on an antenna port may be inferred from a channel conveying another symbol on the same antenna port. When the large-scale properties of a channel carrying a symbol on one antenna port may be inferred from a channel carrying a symbol on another antenna port, the two antenna ports may be said to be in a quasi co-located or quasi co-location (QCL) relationship. The large-scale properties include one or more of delay spread, Doppler spread, frequency shift, average received power, received timing, average delay, and a spatial reception (Rx) parameter. The spatial Rx parameter refers to a spatial (Rx) channel property parameter such as an angle of arrival.

Figure 3:
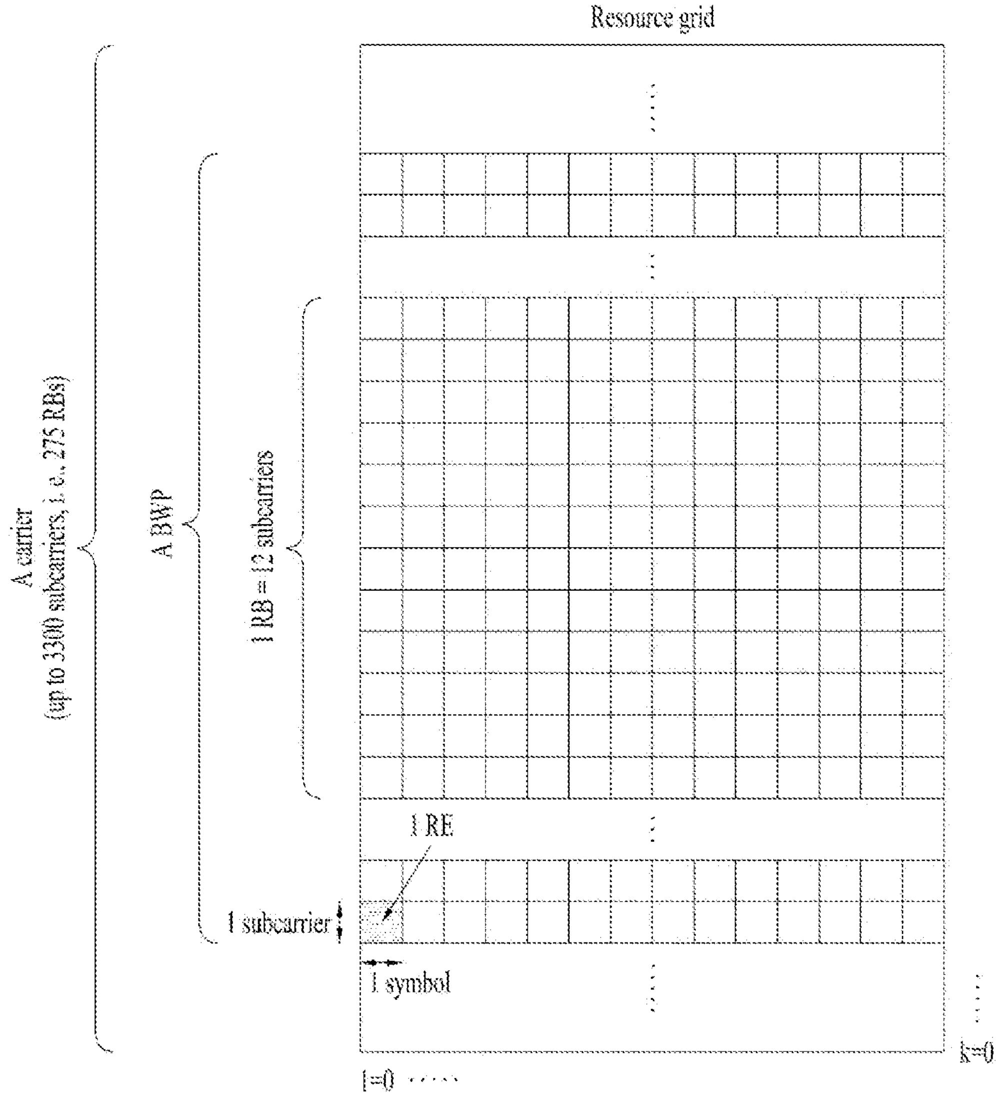
FIG. 3 illustrates an exemplary resource grid to which various embodiments are applicable.

FIG. 3 illustrates an exemplary resource grid to which various embodiments are applicable.

Referring to FIG. 3, for each subcarrier spacing (SCS) and carrier, a resource grid is defined as $14\times2^{\mu}$ OFDM symbols by $$N_{grid}^{size,\mu} \times N_{SC}^{RB}$$

subcarriers, where $$N_{grid}^{size,\mu}$$

is indicated by RRC signaling from the BS.

$$N_{grid}^{size,\mu}$$

may vary according to an SCS configuration μ and a transmission direction, UL or DL. There is one resource grid for an SCS configuration μ, an antenna port p, and a transmission direction (UL or DL). Each element of the resource grid for the SCS configuration μ and the antenna port p is referred to as an RE and uniquely identified by an index pair (k, l) where k represents an index in the frequency domain, and l represents a symbol position in the frequency domain relative to a reference point. The RE (k, l) for the SCS configuration μ and the antenna port p corresponds to a physical resource and a complex value $$a_{k,l}^{(p,\mu)}.$$

An RB is defined as $$N_{SC}^{RB} = 12$$

consecutive subcarriers in the frequency domain.

Considering that the UE may not be capable of supporting a wide bandwidth supported in the NR system, the UE may be configured to operate in a part (bandwidth part (BWP)) of the frequency bandwidth of a cell.

Figure 4:
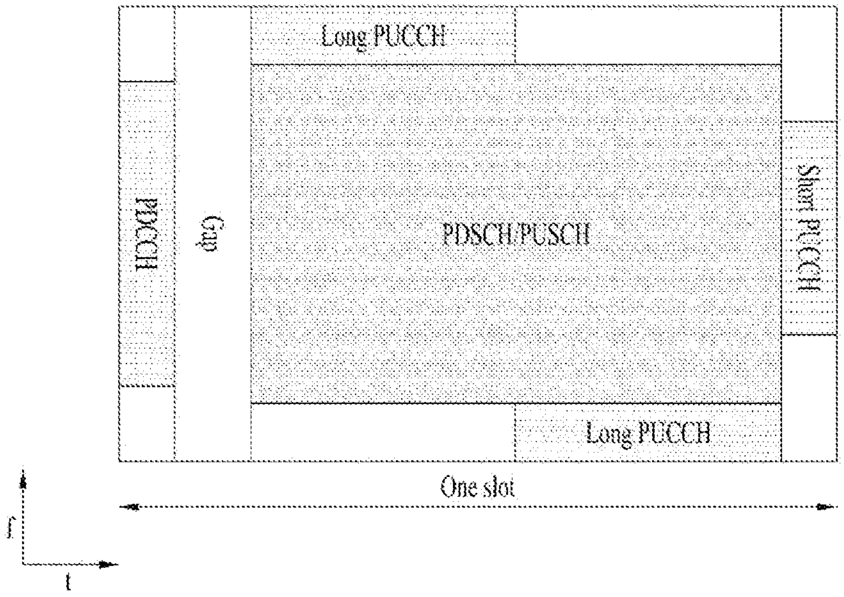
FIG. 4 is a diagram illustrating mapping of physical channels in a slot, to which various embodiments are applicable.

FIG. 4 is a diagram illustrating exemplary mapping of physical channels in a slot, to which various embodiments are applicable.

One slot may include all of a DL control channel, DL or UL data, and a UL control channel. For example, the first N symbols of a slot may be used to transmit a DL control channel (hereinafter, referred to as a DL control region), and the last M symbols of the slot may be used to transmit a UL control channel (hereinafter, referred to as a UL control region). Each of N and M is an integer equal to or larger than 0. A resource area (hereinafter, referred to as a data region) between the DL control region and the UL control region may be used to transmit DL data or UL data. There may be a time gap for DL-to-UL or UL-to-DL switching between a control region and a data region. A PDCCH may be transmitted in the DL control region, and a PDSCH may be transmitted in the DL data region. Some symbols at a DL-to-UL switching time in the slot may be used as the time gap.

The BS transmits related signals to the UE on DL channels as described below, and the UE receives the related signals from the BS on the DL channels.

The PDSCH conveys DL data (e.g., DL-shared channel transport block (DL-SCH TB)) and uses a modulation scheme such as quadrature phase shift keying (QPSK), 16-ary quadrature amplitude modulation (16 QAM), 64 QAM, or 256 QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling.

The UE transmits related signals on later-described UL channels to the BS, and the BS receives the related signals on the UL channels from the UE.

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH.

2. Positioning

Positioning may refer to determining the geographical position and/or velocity of the UE based on measurement of radio signals. Location information may be requested by and reported to a client (e.g., an application) associated with to the UE. The location information may also be requested by a client within or connected to a core network. The location information may be reported in standard formats such as formats for cell-based or geographical coordinates, together with estimated errors of the position and velocity of the UE and/or a positioning method used for positioning.

2.1. Positioning Protocol Configuration

Figure 5:
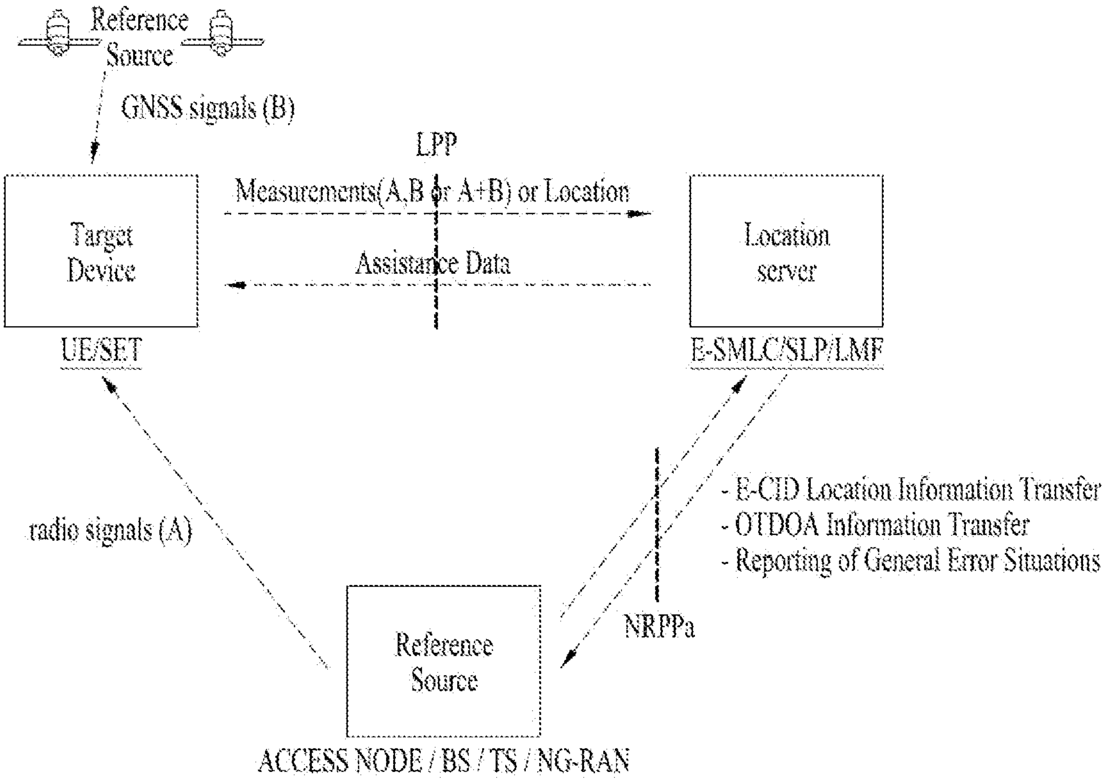
FIG. 5 is a diagram illustrating a positioning protocol configuration for positioning a user equipment (UE), to which various embodiments are applicable.

FIG. 5 is a diagram illustrating an exemplary positioning protocol configuration for positioning a UE, to which various embodiments are applicable.

Referring to FIG. 5, an LTE positioning protocol (LPP) may be used as a point-to-point protocol between a location server (E-SMLC and/or SLP and/or LMF) and a target device (UE and/or SET), for positioning the target device using position-related measurements obtained from one or more reference resources. The target device and the location server may exchange measurements and/or location information based on signal A and/or signal B over the LPP.

NRPPa may be used for information exchange between a reference source (access node and/or BS and/or TP and/or NG-RAN node) and the location server.

The NRPPa protocol may provide the following functions.

- E-CID Location Information Transfer. This function allows the reference source to exchange location information with the LMF for the purpose of E-CID positioning.
- OTDOA Information Transfer. This function allows the reference source to exchange information with the LMF for the purpose of OTDOA positioning.
- Reporting of General Error Situations. This function allows reporting of general error situations, for which function-specific error messages have not been defined.

2.2. PRS (Positioning Reference Signal)

For such positioning, a positioning reference signal (PRS) may be used. The PRS is a reference signal used to estimate the position of the UE.

A positioning frequency layer may include one or more PRS resource sets, each including one or more PRS resources.

Sequence Generation

A PRS sequence r(m) (m=0, 1, . . . ) may be defined by Equation 1.

$$r(m)=\frac{1}{\sqrt{2}}(1-2c(m))+j\frac{1}{\sqrt{2}}(1-2c(m+1)) \qquad \text{[Equation 1]}$$

c(i) may be a pseudo-random sequence. A pseudo-random sequence generator may be initialized by Equation 2.

$$c_{init}=\left(2^{22}\left\lfloor\frac{n_{ID,seg}^{PRS}}{1024}\right\rfloor+2^{10}\left(N_{symb}^{slot}n_{s,f}^{\mu}+l+1\right)\left(2\left(n_{ID,seg}^{PRS}\bmod 1024\right)+1\right)+\left(n_{ID,seq}^{PRS}\bmod 1024\right)\right)\bmod 2^{31} \qquad \text{[Equation 2]}$$

$$n_{s,f}^{\mu}$$

may be a slot number in a frame in an SCS configuration μ. A DL PRS sequence ID $$n_{ID,seq}^{PRS}\in\{0,1,\ldots,4095\}$$

may be given by a higher-layer parameter (e.g., DL-PRS-SequenceId). l may be an OFDM symbol in a slot to which the sequence is mapped.

Mapping to Physical Resources in a DL PRS Resource

A PRS sequence r(m) may be scaled by $\beta_{PRS}$ and mapped to REs $(k,l)_{p,\mu}$, specifically by Equation 3. $(k,l)_{p,\mu}$ may represent an RE (k, l) for an antenna port p and the SCS configuration μ.

$$a_{k,l}^{(p,\mu)}=\beta_{PRS}r(m) \qquad \text{[Equation 3]}$$

$$m=0,1,\ldots$$

$$k=mK_{comb}^{PRS}+\left(\left(k_{offset}^{PRS}+k'\right)\bmod K_{comb}^{PRS}\right)$$

-continued $$l = l_{start}^{PRS}, l_{start}^{PRS}+1, \ldots, l_{start}^{PRS}+L_{PRS}-1$$

Herein, the following conditions may have to be satisfied:

The REs $(k,l)_{p,\mu}$ are included in an RB occupied by a DL PRS resource configured for the UE;

The symbol l not used by any SS/PBCH block used by a serving cell for a DL PRS transmitted from the serving cell or indicated by a higher-layer parameter SSB-positionInBurst for a DL PRS transmitted from a non-serving cell;

A slot number satisfies the following PRS resource set-related condition;

$$l_{start}^{PRS}$$

is the first symbol of the DL PRS in the slot, which may be given by a higher-layer parameter DL-PRS-ResourceSymbolOffset. The time-domain size of the DL PRS resource, $L_{PRS} \in \{2, 4, 6, 12\}$ may be given by a higher-layer parameter DL-PRS-NumSymbols. A comb size $$K_{comb}^{PRS} \in \{2, 4, 6, 12\}$$

may be given by a higer-layer parameter transmissionComb. A combination $$\{L_{PRS}, K_{comb}^{PRS}\}$$

of $L_{PRS}$ and $$K_{comb}^{PRS}$$

may be one of {2, 2}, {4, 2}, {6, 2}, {12, 2}, {4, 4}, {12, 4}, {6, 6}, {12, 6} and/or {12, 12}. An RE offset $$k_{offset}^{PRS} \in \{0, 1, \ldots, K_{comb}^{PRS}-1\}$$

may be given by combOffset. A frequency offset k' may be a function of $$l - l_{start}^{PRS}$$

as shown in Table 8.

TABLE 8

| | Symbol number within the downlink PRS resource $l - l_{start}^{PRS}$ | | | | | | | | | | | |
|---|---|---|---|---|---|---|---|---|---|---|---|---|
| $K_{comb}^{PRS}$ | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

A reference point for k=0 may be the position of point A in a positioning frequency layer in which the DL PRS resource is configured. Point A may be given by a higher-layer parameter dl-PRS-PointA-r16.

Mapping to Slots in a DL PRS Resource Set

A DL PRS resource included in a DL PRS resource set may be transmitted in a slot and a frame which satisfy the following Equation 4.

$$\left(N_{slot}^{frame,\mu} n_f + n_{s,f}^{\mu} - T_{offset}^{PRS} - T_{offset,res}^{PRS}\right) \bmod 2^{\mu} T_{per}^{PRS} \in \left\{iT_{gap}^{PRS}\right\}_{i=0}^{T_{rep}^{PRS}-1} \quad \text{[Equation 4]}$$

$$N_{slot}^{frame,\mu}$$

may be the number of slots per frame in the SCS configuration μ. $n_f$ may be a system frame number (SFN).

$$n_{s,f}^{\mu}$$

may be a slot number in a frame in the SCS configuration μ. A slot offset $$T_{offset}^{PRS} \in \{0, 1, \ldots, T_{per}^{PRS}-1\}$$

may be given by a higher-layer parameter DL-PRS-ResourceSetSlotOffset. A DL PRS resource slot offset $$T_{offset,res}^{PRS}$$

may be given by a higher layer parameter DL-PRS-ResourceSlotOffset. A periodicity $$T_{per}^{PRS} \in \{4, 5, 8, 10, 16, 20, 32, 40, 64, 80, 160, 320, 640, 1280, 2560, 5120, 10240\}$$

may be given by a higher-layer parameter DL-PRS-Periodicity. A repetition factor $$T_{rep}^{PRS} \in \{1, 2, 3, 4, 6, 8, 16, 32\}$$

may be given by a higher-layer parameter DL-PRS-ResourceRepetitionFactor. A muting repetition factor $$T_{muting}^{PRS}$$

may be given by a higher-layer parameter DL-PRS-MutingBitRepetitionFactor. A time gap $$T_{gap}^{PRS} \in \{1, 2, 3, 4, 6, 8, 16, 32\}$$

may be given by a higher-layer parameter DL-PRS-ResourceTimeGap.

2.3. UE Positioning Architecture

Figure 6:
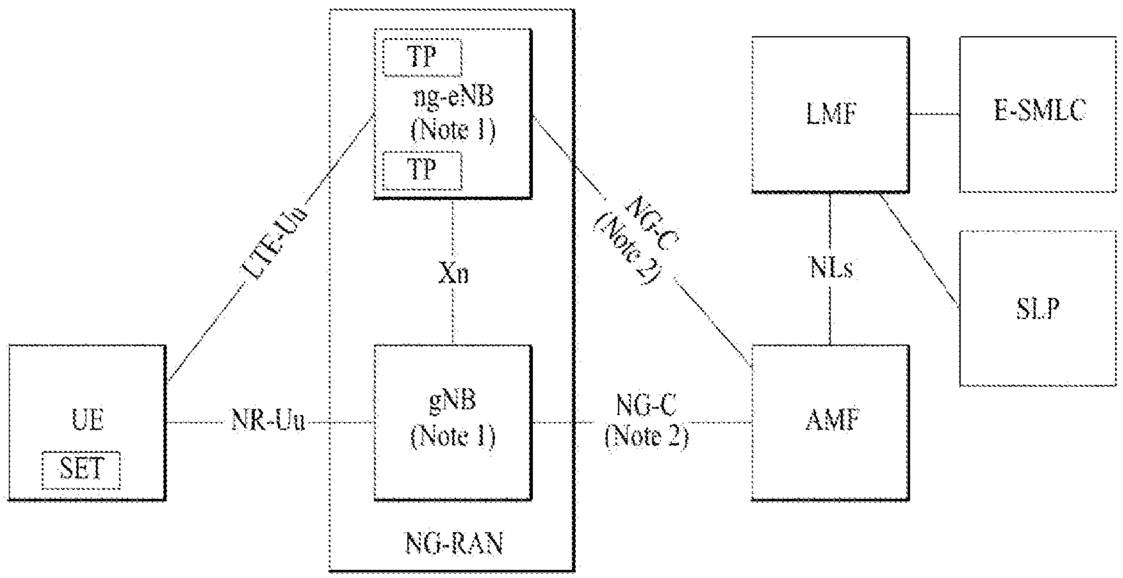
FIG. 6 illustrates an exemplary system architecture for measuring positioning of a UE to which various embodiments are applicable.

FIG. 6 illustrates an exemplary system architecture for measuring positioning of a UE to which various embodiments are applicable.

Referring to FIG. 6, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 7:
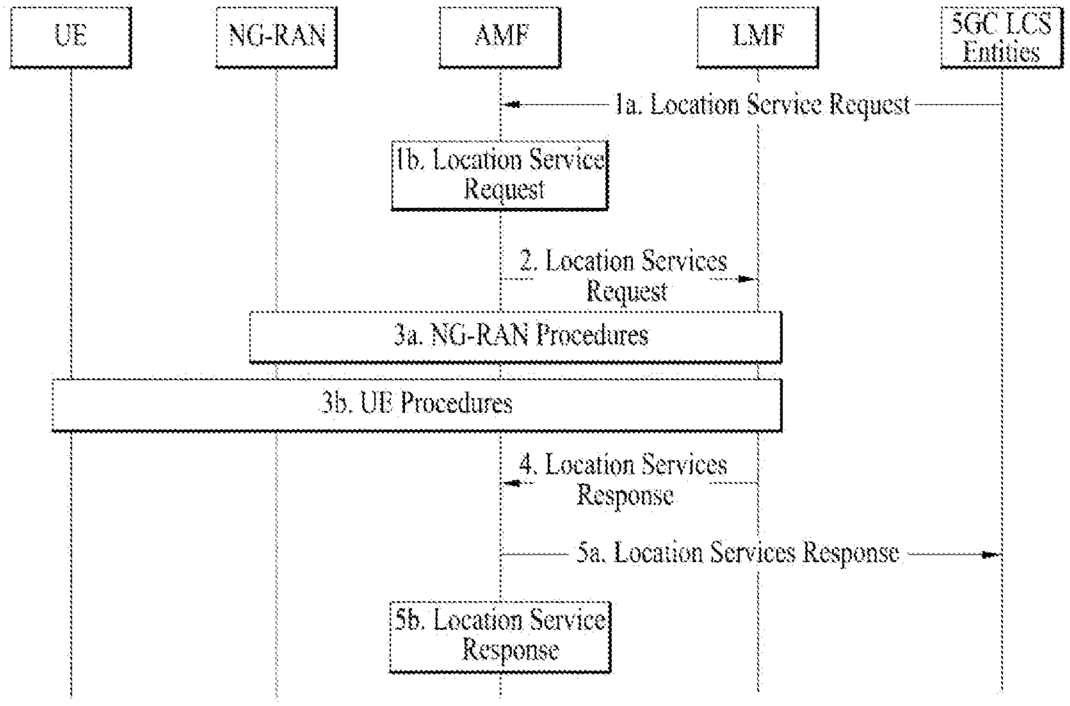
FIG. 7 illustrates an implementation example of a network for UE positioning.

FIG. 7 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 7. In other words, in FIG. 7, it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 7. In step 1*a*, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1*b*. For example, the serving AMF may determine that itself will perform the location service in order to measure the position of the UE for an emergency call.

In step 2, the AMF transfers the request for the location service to an LMF. In step 3*a*, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3*a* may be an NRPPa protocol which will be described later.

Additionally, in step 3*b*, the LMF may initiate a location procedure for DL positioning together with the UE. For example, the LMF may transmit the location assistance data to the UE or obtain a location estimate or location measurement value. For example, in step 3*b*, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3*b*, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner In some cases, the LMF may transfer the location assistance data and/or the additional assistance data to the UE without receiving a request for the assistance data from the UE.

As another example, in step 3*b*, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3*b* may be performed independently but may be performed consecutively. Generally, although step 3*b* is performed in order of the capability information transfer procedure, the location assistance data transfer procedure, and the location information transfer procedure, step 3*b* is not limited to such order. In other words, step 3*b* is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3*b*, when information or requests exchanged between the LMF and the UE are erroneous, an error message may be transmitted and received and an abort message for aborting positioning may be transmitted and received.

Protocol used in step 3*b* may be an LPP protocol which will be described later.

Step 3*b* may be performed additionally after step 3*a* but may be performed instead of step 3*a*.

In step 4, the LMF may provide a location service response to the AMF. The location service response may include information as to whether UE positioning is successful and include a location estimate value of the UE. If the procedure of FIG. 7 has been initiated by step 1*a*, the AMF may transfer the location service response to a 5GC entity such as a GMLC. If the procedure of FIG. 7 has been initiated by step 1*b*, the AMF may use the location service response in order to provide a location service related to an emergency call.

2.5. Positioning Protocol

LTE Positioning Protocol (LPP)

Figure 8:
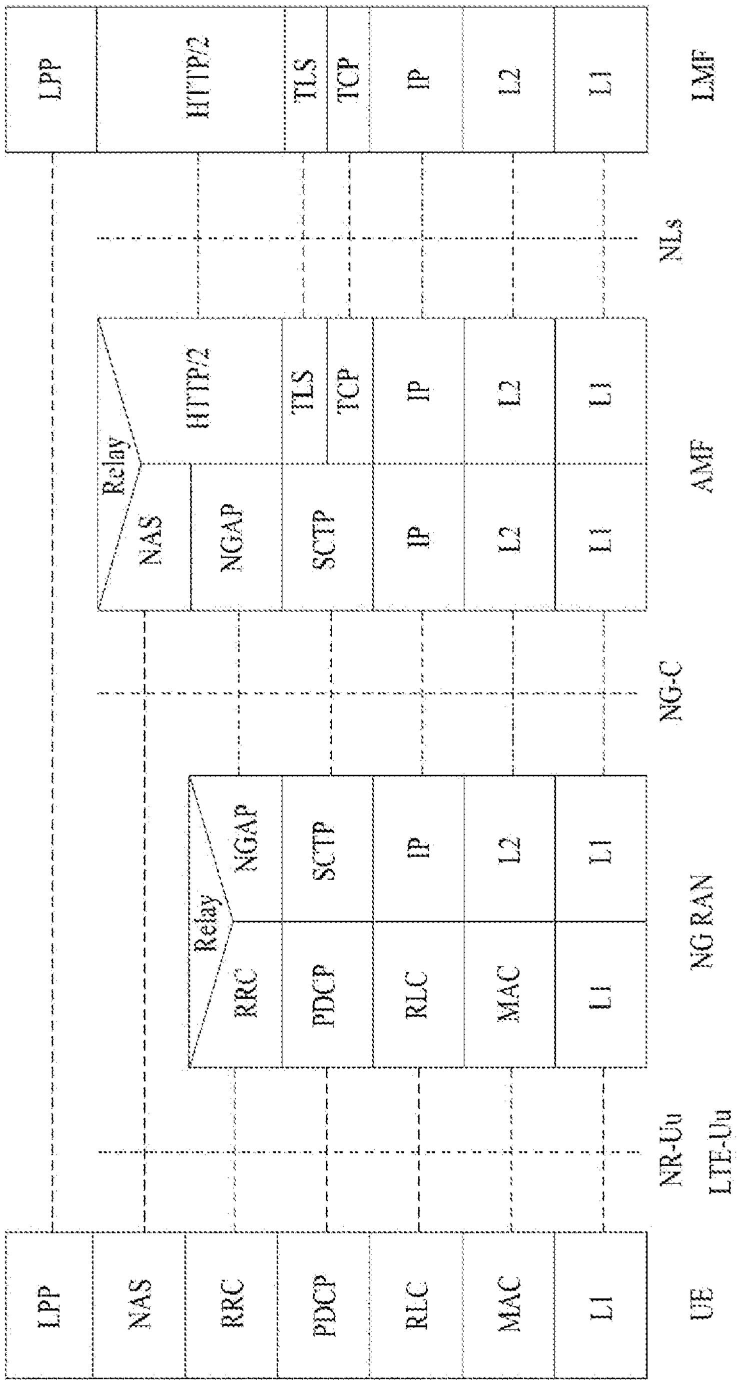
FIG. 8 is a diagram illustrating protocol layers for supporting LTE positioning protocol (LPP) message transmission, to which various embodiments are applicable.

FIG. 8 illustrates an exemplary protocol layer used to support LPP message transfer between an LMF and a UE. An LPP protocol data unit (PDU) may be carried in a NAS PDU between an AMF and the UE.

Referring to FIG. 8, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

NR Positioning Protocol A (NRPPa)

Figure 9:
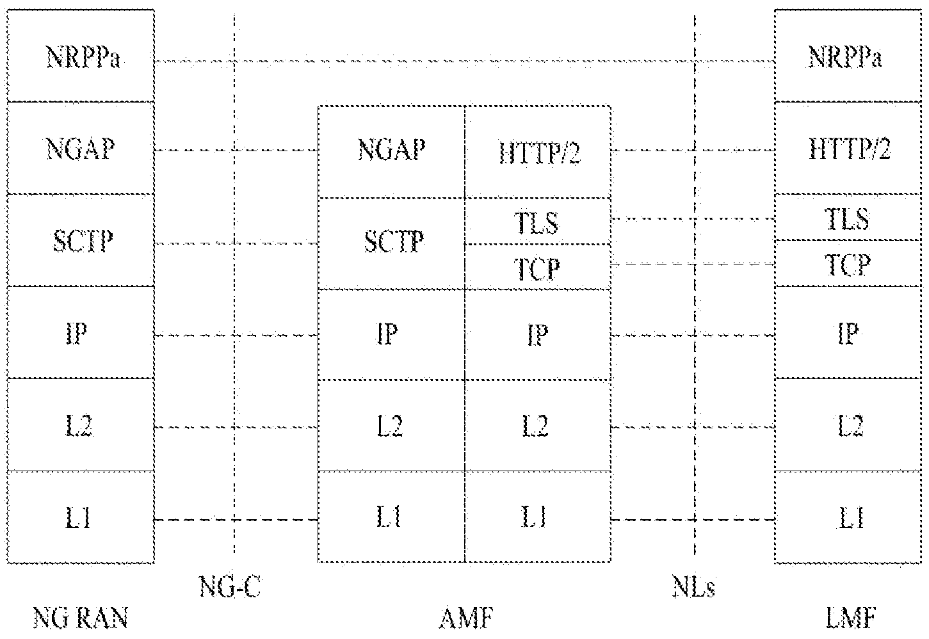
FIG. 9 is a diagram illustrating protocol layers for supporting NR positioning protocol a (NRPPa) protocol data unit (PDU) transmission, to which various embodiments are applicable.

FIG. 9 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

OTDOA (Observed Time Difference of Arrival)

Figure 10:
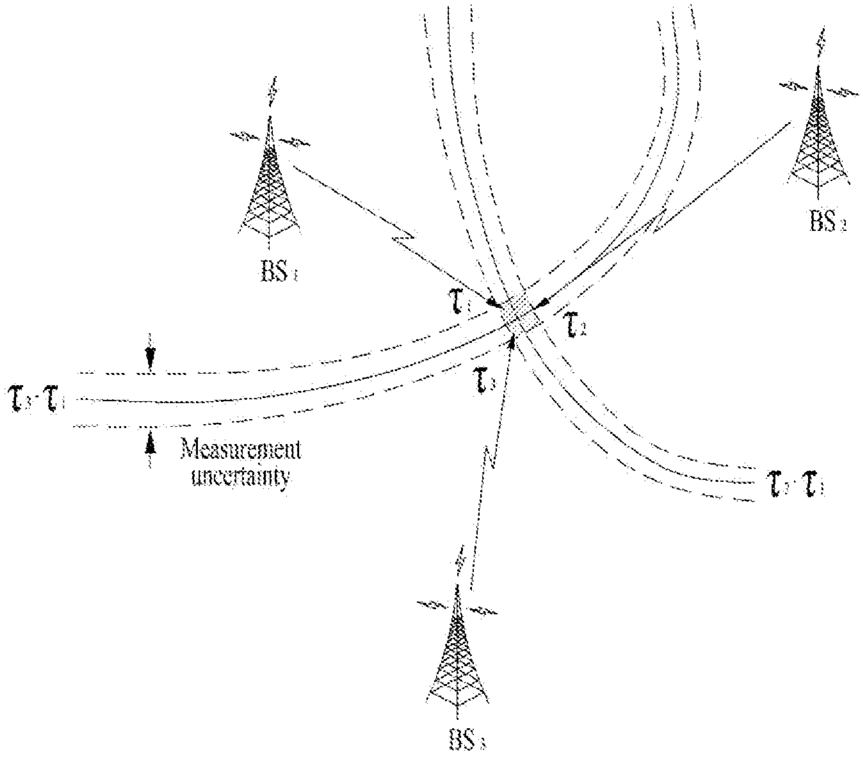
FIG. 10 is a diagram illustrating an observed time difference of arrival (OTDOA) positioning method, to which various embodiments are applicable.

FIG. 10 is a diagram illustrating an observed time difference of arrival (OTDOA) positioning method, to which various embodiments are applicable;

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 5 below.

$$RSTDi_{,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \quad \text{[Equation 5]}$$

In Equation 5, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i - T_1)$ is a transmission time offset between two TPs, referred to as "real time differences" (RTDs), and $n_i$ and $n_1$ are UE ToA measurement error values.

E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx−Tx time difference, timing advance (TADV), and/or AoA Here, TADV may be divided into Type 1 and Type 2 as follows.

$T_{ADV}$ Type 1=(ng-eNB Rx−Tx time difference)+(UE E-UTRA Rx−Tx time difference)

TADV Type 2=ng-eNB Rx−Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

Multi RTT (Multi-Cell RTT)

Figure 11:
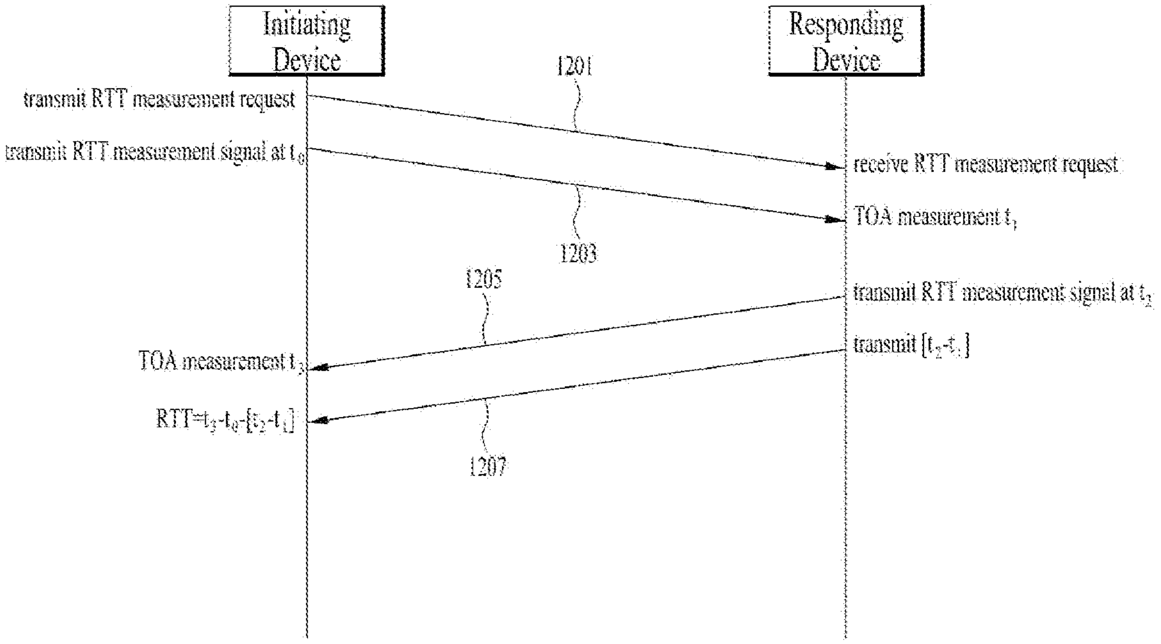
FIG. 11 is a diagram illustrating a multi-round trip time (multi-RTT) positioning method to which various embodiments are applicable.
Figure 11:
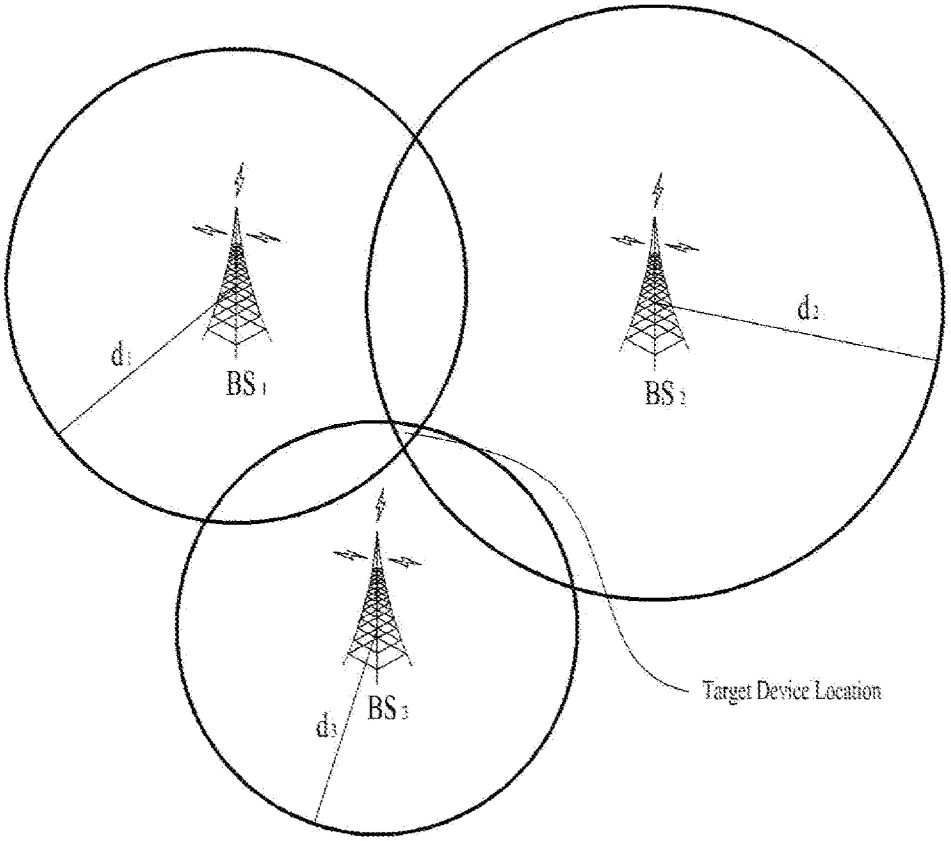
Figure 12:
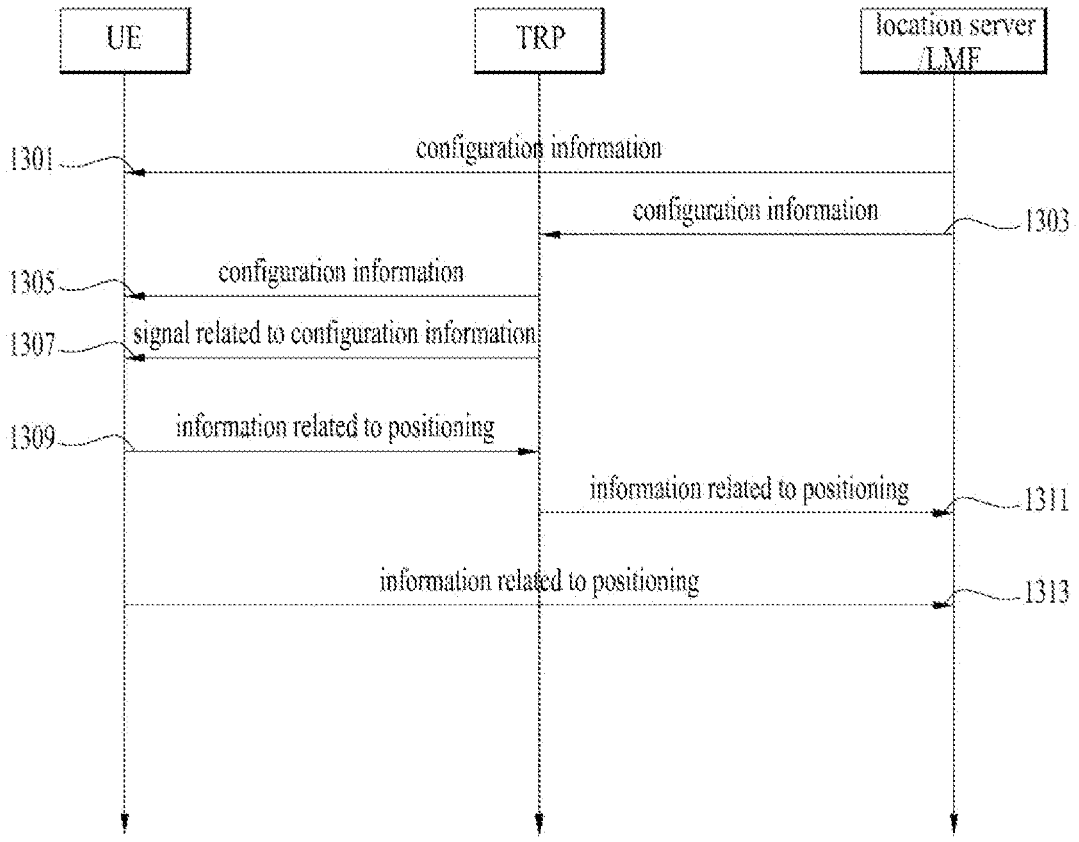
FIG. 12 is a simplified diagram illustrating a method of operating a UE, a transmission and reception point (TRP), a location server, and/or a location management function (LMF) according to various embodiments.

FIG. 11 is a diagram illustrating an exemplary multi-round trip time (multi-RTT) positioning method to which various embodiments are applicable.

Referring to FIG. 11(*a*), an exemplary RTT procedure is illustrated, in which an initiating device and a responding device perform ToA measurements, and the responding device provides ToA measurements to the initiating device, for RTT measurement (calculation). The initiating device may be a TRP and/or a UE, and the responding device may be a UE and/or a TRP.

In operation 1301 according to various embodiments, the initiating device may transmit an RTT measurement request, and the responding device may receive the RTT measurement request.

In operation 1303 according to various embodiments, the initiating device may transmit an RTT measurement signal at t0 and the responding device may acquire a ToA measurement t1.

In operation 1305 according to various embodiments, the responding device may transmit an RTT measurement signal at t2 and the initiating device may acquire a ToA measurement t3.

In operation 1307 according to various embodiments, the responding device may transmit information about [t2−t1], and the initiating device may receive the information and calculate an RTT by Equation 6. The information may be transmitted and received based on a separate signal or in the RTT measurement signal of operation 1305.

$$RTT = t_3 - t_0 - [t_2 - t_1] \quad \text{[Equation 6]}$$

Referring to FIG. 11(*b*), an RTT may correspond to a double-range measurement between two devices. Positioning estimation may be performed from the corresponding information, and multilateration may be used for the positioning estimation. $d_1$, $d_2$, and $d_3$ may be determined based on the measured RTT, and the location of a target device may be determined to be the intersection of the circumferences of circles with radiuses of $d_1$, $d_2$, and $d_3$, in which $BS_1$, $BS_2$, and $BS_3$ (or TRPs) are centered, respectively.

2.7. Sounding Procedure

In a wireless communication system to which various embodiments are applicable, an SRS for positioning may be used.

An SRS-Config information element (IE) may be used to configure SRS transmission. (A list of) SRS resources and/or (a list of) SRS resource sets may be defined, and each resource set may be defined as a set of SRS resources.

The SRS-Config IE may include configuration information on an SRS (for other purposes) and configuration information on an SRS for positioning separately. For example, configuration information on an SRS resource set for the SRS (for other purposes) (e.g., SRS-ResourceSet) and configuration information on an SRS resource set for the SRS for positioning (e.g., SRS-PosResourceSet) may be included separately. In addition, configuration information on an SRS resource for the SRS (for other purposes) (e.g., SRS-ResourceSet) and configuration information on an SRS resource for the SRS for positioning (e.g., SRS-PosResource) may be included separately.

An SRS resource set for positioning may include one or more SRS resources for positioning. Configuration information on the SRS resource set for positioning may include: information on an identifier (ID) that is assigned/allocated/related to the SRS resource set for positioning; and information on an ID that is assigned/allocated/related to each of the one or more SRS resources for positioning. For example, configuration information on an SRS resource for positioning may include an ID assigned/allocated/related to a UL resource. In addition, each SRS resource/SRS resource set for positioning may be identified based on each ID assigned/allocated/related thereto.

The SRS may be configured periodically/semi-persistently/aperiodically.

An aperiodic SRS may be triggered by DCI. The DCI may include an SRS request field.

Table 6 shows an exemplary SRS request field.

TABLE 6

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 00 | No aperiodic SRS resource set triggered | No aperiodic SRS resource set triggered |
| 01 | SRS resource set(s) configured by SRS-ResourceSet with higher layer parameter aperiodicSRS-ResourceTrigger set to 1 or an entry in aperiodicSRS-ResourceTriggerList set to 1 SRS resource set(s) configured by SRS-PosResourceSet with an entry in aperiodicSRS-ResourceTriggerList set to 1 when triggered by DCI formats 0_1, 0_2, 1_1 and 1_2 | SRS resource set(s) configured with higher layer parameter usage in SRS-ResourceSet set to 'antennaSwitching' and resourceType in SRS-ResourceSet set to 'aperiodic' for a 1st set of serving cells configured by higher layers |
| 10 | SRS resource set(s) configured by SRS-ResourceSet with higher layer parameter aperiodicSRS-ResourceTrigger set to 2 or an entry in aperiodicSRS-ResourceTriggerList set to 2 SRS resource set(s) configured by SRS-PosResourceSet with an entry in aperiodicSRS-ResourceTriggerList set to 2 when triggered by DCI formats 0_1, 0_2, 1_1 and 1_2 | SRS resource set(s) configured with higher layer parameter usage in SRS-ResourceSet set to 'antennaSwitching' and resourceType in SRS-ResourceSet set to 'aperiodic' for a 2nd set of serving cells configured by higher layers |
| 11 | SRS resource set(s) configured by SRS-ResourceSet with higher layer parameter aperiodicSRS-ResourceTrigger set to 3 or an entry in aperiodicSRS-ResourceTriggerList set to 3 SRS resource set(s) configured by SRS-PosResourceSet with an entry in aperiodicSRS-ResourceTriggerList set to 3 when triggered by DCI formats 0_1, 0_2, 1_1 and 1_2 | SRS resource set(s) configured with higher layer parameter usage in SRS-ResourceSet set to 'antennaSwitching' and resourceType in SRS-ResourceSet set to 'aperiodic' for a 3rd set of serving cells configured by higher layers |

In Table 6 srs-TPC-PDCCH-Group is a parameter for setting the triggering type for SRS transmission to type A or type B, aperiodicSRS-ResourceTriggerList is a parameter for configuring an additional list of DCI code points where the UE needs to transmit the SRS according to the SRS resource set configuration, aperiodicSRS-ResourceTrigger is a parameter for configuring a DCI code point where the SRS needs to be transmitted according to the SRS resource set configuration, and resourceType is a parameter for configuring (periodic/semi-static/aperiodic) time domain behavior of the SRS resource configuration.

3. Various Embodiments

A detailed description will be given of various embodiments based on the above technical ideas. The afore-described contents of Section 1 and Section 2 are applicable to various embodiments described below. For example, operations, functions, terminologies, and so on which are not defined in various embodiments may be performed and described based on Section 1 and Section 2.

Symbols/abbreviations/terms used in the description of various embodiments may be defined as follows.

A/B/C: A and/or B and/or C

AOA (AoA): angle of arrival

CSI-RS: channel state information reference signal

ECID: enhanced cell identifier

GPS: global positioning system

GNSS: global navigation satellite system

LMF: location management function

MAC: medium access control

MAC-CE: MAC-control element

OTDOA (OTDoA): observed time difference of arrival

PRS: positioning reference signal

RS: reference signal

RTT: round trip time

RSRP: reference signal received power

RSRQ: reference signal received quality

RSTD: reference signal time difference/relative signal time difference

SINR: signal to interference plus noise ratio

SNR: signal to noise ratio

SRS: sounding reference signal. According to various embodiments, the SRS may be used for UL channel estimation based on multi-input multi-output (MIMO) and positioning measurement. In other words, according to various embodiments, the SRS may include a normal SRS and a positioning SRS. According to various embodiments, the positioning SRS may be understood as a UL RS configured and/or used for UE positioning. According to various embodiments, the normal SRS is different from the positioning SRS. Specifically, the normal SRS may be understood as a UL RS configured and/or used for UL channel estimation (additionally or alternatively, the normal SRS may be understood as a UL RS configured and/or used for UL channel estimation and positioning). According to various embodiments, the positioning SRS may also be referred to as an SRS for positioning. In the description of various embodiments, the following terms: 'positioning SRS' and 'SRS for positioning' may be used interchangeably and understood to have the same meaning. According to various embodiments, the normal SRS may also be referred to as a legacy SRS, a MIMO SRS, an SRS for MIMO, or the like. In the description of various embodiments, the following terms: 'normal SRS', 'legacy SRS', 'MIMO SRS', and 'SRS for MIMO' may be used interchangeably and understood to have the same meaning. For example, the normal SRS and the positioning SRS may be separately configured/indicated. For example, the normal SRS and the positioning SRS may be configured/indicated by different information elements (IEs) of higher layers. For example, the normal SRS may be configured based on SRS-resource, and the positioning SRS may be configured based on SRS-PosResource. In the description of various embodiments, the positioning SRS may be understood as an exemplary UL PRS.

SS: synchronization signal

SSB: synchronization signal block

SS/PBCH: synchronization signal/physical broadcast channel

TDOA (TDoA): timing difference of arrival

TOA (ToA): time of arrival

TRP: transmission and reception point (TP: transmission point)

UTDOA (UTDoA): uplink time difference of arrival

In the description of various embodiments, the term "BS" may be understood as an umbrella term including a remote radio head (RRH), an eNB, a gNB, a TP, a reception point (RP), a relay, etc.

In the description of various embodiments, when it is said that something is more than/more than or equal to A, it may be interpreted to mean that the thing is more than or equal to/more than A.

In the description of various embodiments, when it is said that something is less than/less than or equal to B, it may be interpreted to mean that the thing is less than or equal to/less than B.

In the description of various embodiments, unless specifically stated otherwise, all UE operations proposed/mentioned/described/suggested herein may be configured/indicated by a network and/or defined by default.

In the description of various embodiments, unless specifically stated otherwise, the "subject" of all configurations/indications proposed/mentioned/described/suggested herein may be a BS and/or location server.

In the description of various embodiments, unless specifically stated otherwise, the network may refer to the BS and/or location server.

In the descriptions of various embodiments, unless specifically stated otherwise, an LTE positioning protocol (LPP) may not mean positioning protocols used only in the LTE system. Considering that the LPP is reused in NR to support NR positioning, the LPP may also be used for UE positioning in 5G and/or future wireless systems.

In the description of various embodiments, unless specifically stated otherwise, aperiodic (AP) triggering state(s) may be configured by the BS to the UE through RRC signaling or by the location server to the UE through LPP signaling.

In the description of various embodiments, unless specifically stated otherwise, the "subject" of "configurations" and/or "indications" may be the BS and/or location server.

In the description of various embodiments, unless specifically stated otherwise, the "object" of "configurations" and/or "indications" may be a UE (e.g., a user device such as a cell-phone, a car, etc.).

Although various embodiments are described with an emphasis on a PRS, the PRS may be replaced with a CSI-RS, an SSB, an SRS for positioning, and the like. That is, the following embodiments may be applied to any RS for positioning, and the embodiments are not limited to the PRS.

In the description of various embodiments, a UE-based positioning method may relate to a method in which the UE directly calculates/obtains its own location/positioning information.

In the description of various embodiments, a UE-assisted positioning method may relate to the following method: the UE calculates/obtains and reports measurements related to UE location/positioning (e.g., values used by the BS/server (or location server)/LMF for UE positioning, and more particularly, measurement values for at least one of RSTD, AoA, AoD, RTT, ToA, etc.), and upon receiving the measurements, the network node (e.g., BS, server, LMF, etc.) calculates/obtains the location/positioning of the UE.

Various embodiments may relate to methods and apparatuses for supporting AP transmission and/or reporting for effective/low-latency positioning based on a PRS used to estimate the location of a UE. In the description of various embodiments, a PRS transmitted and received aperiodically may be referred to as an AP PRS.

Figure 13:
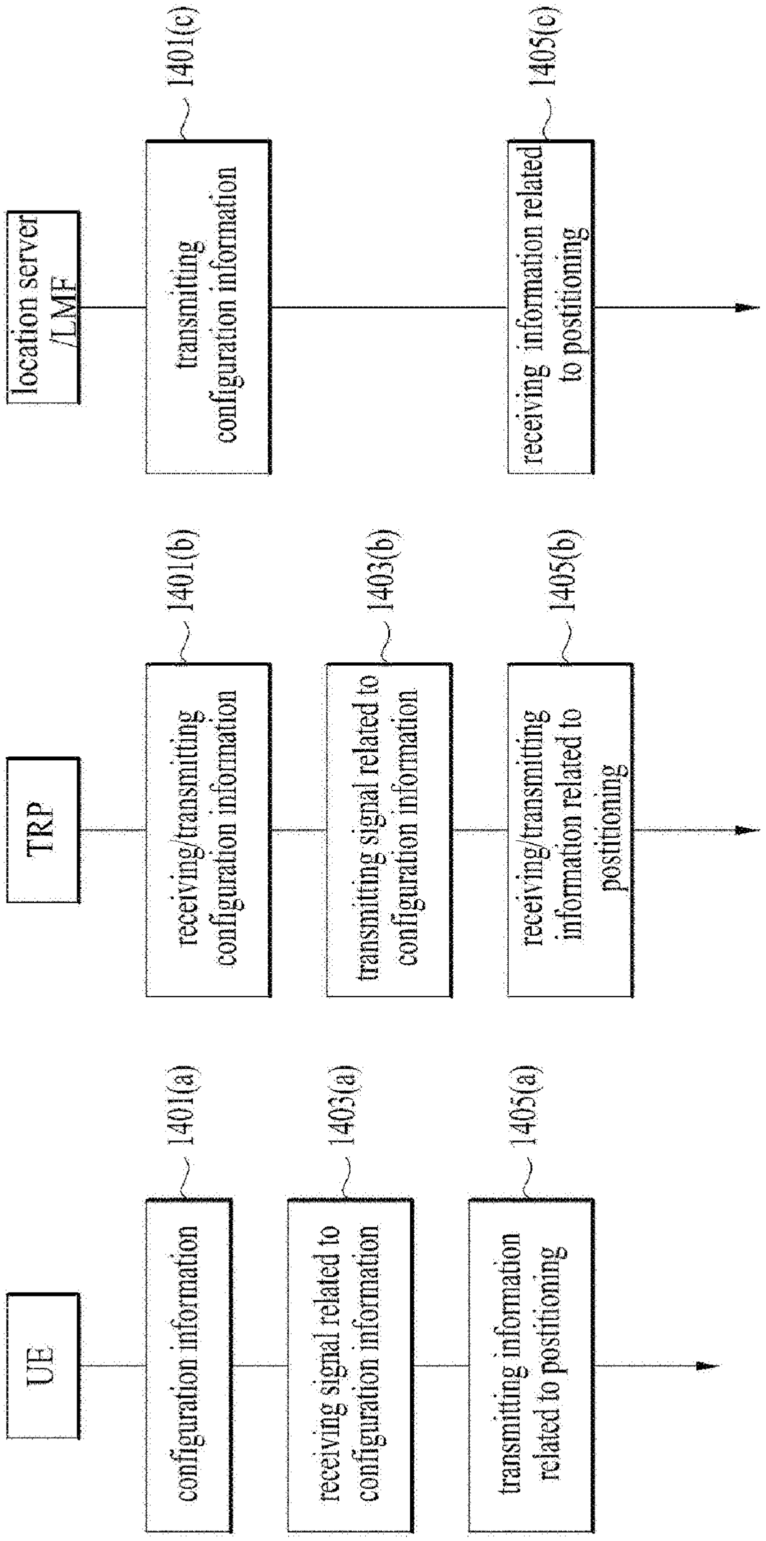
FIG. 13 is a simplified diagram illustrating a method of operating a UE, a TRP, a location server, and/or an LMF according to various embodiments.

FIG. 13 is a simplified diagram illustrating an operating method of a UE, a TRP, a location server, and/or an LMF according to various embodiments.

Referring to FIG. 13, in operation 1301 according to various embodiments, the location server and/or the LMF may transmit configuration information to the UE, and the UE may receive the configuration information.

In operation 1303 according to various embodiments, the location server and/or the LMF may transmit reference configuration information to the TRP, and the TRP may receive the reference configuration information. In operation 1305 according to various embodiments, the TRP may transmit the reference configuration information to the UE, and the UE may receive the reference configuration information. In this case, operation 1301 according to various embodiments may be omitted.

In contrast, operations 1303 and 1305 according to various embodiments may be omitted. In this case, operation 1301 according to various embodiments may be performed.

That is, operation 1301 according to various embodiments, and operations 1303 and 1305 according to various embodiments may be selectively performed.

In operation 1307 according to various embodiments, the TRP may transmit a signal related to the configuration information, and the UE may receive the signal related to the configuration information. For example, the signal related to the configuration information may be a signal for positioning of the UE.

In operation 1309 according to various embodiments, the UE may transmit a signal related to positioning to the TRP, and the TRP may receive the signal related to positioning. In operation 1311 according to various embodiments, the TRP may transmit the signal related to positioning to the location server and/or the LMF, and the location server and/or the LMF may receive the signal related to positioning.

In operation 1313 according to various embodiments, the UE may transmit the signal related to positioning to the location server and/or the LMF, and the location server and/or the LMF may receive the signal related to positioning. In this case, operations 1309 and 1311 according to various embodiments may be omitted.

In contrast, operation 1313 according to various embodiments may be omitted. In this case, operations 1309 and 1311 according to various embodiments may be performed.

That is, operations 1309 and 1311 according to various embodiments, and operation 1313 according to various embodiments may be selectively performed.

According to various embodiments, the signal related to positioning may be obtained based on the configuration information and/or the signal related to the configuration information.

Figures 14, 15:
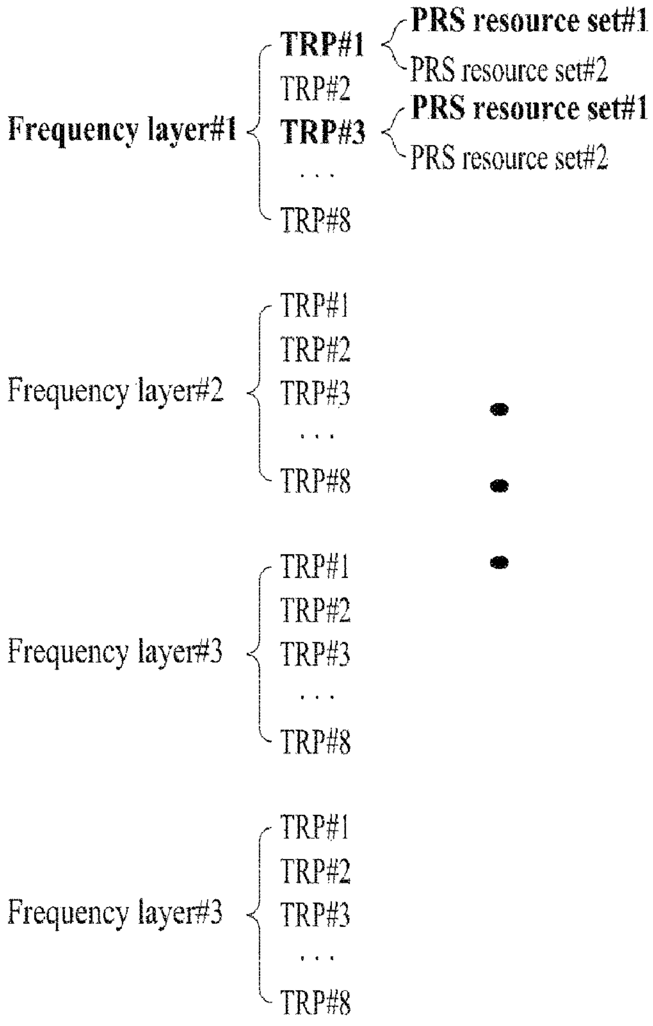
FIG. 14 is a diagram illustrating exemplary aperiodic (AP) positioning reference signal (PRS) triggering according to various embodiments.
FIG. 15 is a diagram illustrating exemplary AP PRS triggering according to various embodiments.

FIG. 14 is a simplified diagram illustrating an operating method of a UE, a TRP, a location server, and/or an LMF according to various embodiments.

Referring to FIG. 14(*a*), in operation 1401(*a*) according to various embodiments, the UE may receive configuration information.

In operation 1403(*a*) according to various embodiments, the UE may receive a signal related to the configuration information.

In operation 1405(*a*) according to various embodiments, the UE may transmit information related to positioning.

Referring to FIG. 14(*b*), in operation 1401(*b*) according to various embodiments, the TRP may receive configuration information from the location server and/or the LMF and transmit the configuration information to the UE.

In operation 1403(*b*) according to various embodiments, the TRP may transmit a signal related to the configuration information.

In operation 1405(*b*) according to various embodiments, the TRP may receive information related to positioning and transmit the information related to positioning to the location server and/or the LMF.

Referring to FIG. 14(*c*), in operation 1401(*c*) according to various embodiments, the location server and/or the LMF may transmit configuration information.

In operation 1405(*c*) according to various embodiments, the location server and/or the LMF may receive information related to positioning.

For example, the above-described configuration information may be understood as relating to reference configuration (information) or one or more pieces of information that the location server, the LMF, and/or the TRP transmits to/configures for the UE and/or may be understood as the reference configuration (information) or one or more pieces of information that the location server, the LMF, and/or the TRP transmits to/configures for the UE, in a description of various embodiments below.

For example, the above signal related to positioning may be understood as a signal related to one or more pieces of information that the UE reports and/or a signal including one or more pieces of information that the UE reports, in a description of various embodiments below.

For example, in a description of various embodiments below, the BS, the gNB, and the cell may be replaced with the TRP, the TP, or any device serving equally as the TRP or the TP.

For example, in a description of various embodiments below, the location server may be replaced with the LMF and any device serving equally as the LMF.

More detailed operations, functions, terms, etc. in operation methods according to various embodiments may be performed and described based on various embodiments described later. The operation methods according to various embodiments are exemplary and one or more operations in the above-described operation methods may be omitted according to detailed content of each embodiment.

Hereinafter, various embodiments will be described in detail. It may be understood by those of ordinary skill in the art that the various embodiments described below may be combined in whole or in part to implement other embodiments unless mutually exclusive.

According to various embodiments, various methods of supporting an AP PRS may be provided.

Background/Motivation

When the UE receives a PRS from the location server/BS, the UE may also receive information on specific positioning frequency layer(s) and/or TRP(s)/physical cell(s) in which the PRS is transmitted.

PRS resource(s) and/or PRS resource set(s) do not have unique resource ID(s) and/or unique resource set ID(s), unlike other DL/UL RSs. Specifically, the PRS resource(s)

and/or PRS resource set(s) may be applied/configured/used redundantly by different TRP(s) and/or different positioning frequency layer(s).

Accordingly, it may be necessary to design higher layer signaling, DCI, and/or MAC-CE for AP PRS triggering.

3.1. AP PRS Triggering without Association with PRS Reporting

In the UE-based positioning, the UE may calculate its own location but may not report positioning measurements to the network. Thus, the UE-based positioning may require only AP PRS triggering but may not require association with PRS measurement reporting.

In Section 3.1, AP PRS triggering methods will be described in consideration of the above points. Specifically, methods of discriminating positioning frequency layer(s) and/or TRP(s)/physical cell(s) and aperiodically triggering a specific positioning frequency layer and/or a PRS to be transmitted will be described. Additionally, methods of triggering a PRS without discriminating positioning frequency layer(s) and/or TRP(s)/physical cell(s) will also be described.

Approach #1: AP PRS Transmission Triggering without Association of AP PRS Reporting Triggering For the UE-based positioning, Approach #1 may be necessary because the UE may report no PRS measurements. To this end, a method of applying AP SRS DCI triggering may be considered, but AP PRS SRS triggering may not be applied as it is due to the features of the PRS.

The PRS may be configured at the level of positioning frequency layer(s), TRP(s), and PRS resource set(s)/resource(s). A single PRS resource set and/or a single PRS resource may not be identified only with information on a specific PRS resource set ID and/or a specific PRS resource ID.

For each TRP, PRS resource set IDs may be newly numbered from the lowest index (e.g., 0 or 1), and for each PRS resource set, PRS resource IDs may also be newly numbered from the lowest index. Thus, to trigger one specific PRS resource set, both a TRP ID configured in association with the specific PRS resource set and a positioning frequency layer configured in association with the TRP ID may be required.

Accordingly, according to various embodiments, various AP triggering levels may be considered to support the AP PRS. Additionally/alternatively, when the AP PRS is supported, it may be necessary to support additional technical attributes required for the AP PRS such as a slot/symbol offset for triggering the AP PRS.

Proposal (Per Resource Set)

According to various embodiments, AP triggered (or triggering) state(s) may be defined for every PRS resource set(s) and/or each PRS resource(s).

According to various embodiments, the network may configure specific AP triggered state(s) (e.g., 0, 1, 2, 3) to the UE as one parameter for configuring PRS resource set(s) and/or PRS resource(s), and each AP triggered state may be configured in association with a specific code point of DCI. According to various embodiments, the network may indicate the specific DCI code point in order to aperiodically trigger a specific PRS resource set configured to the UE.

For example, among PRS resource set(s) configured for different TRP(s), all PRS resource sets configured for the same AP triggered state(s) may be triggered. In order to prevent such a case, the number of states needs to be configured such that all PRS resource set(s) configured in association with each TRP may have different AP triggered state(s). That is, the number of states needs to be configured such that all PRS resource sets associated with each TRP have different AP triggered states. Accordingly, PRSs for multiple TRPs may be triggered.

In addition to PRS resource configuration(s) and/or PRS resource set configuration(s), triggering state(s) and/or AP PRS triggering slot/symbol offset(s) may be additionally configured/indicated.

According to various embodiments, LPP signaling/RRC signaling may be considered to configure the AP triggering state(s).

(Per TRP)

According to various embodiments, a method in which the network performs AP triggering for each TRP may be considered. According to various embodiments, the network may perform AP triggering on all PRS resource set(s) and/or PRS resource(s) transmitted from a specific TRP at once.

(Per Multiple TRPs)

According to various embodiments, triggering may be performed at once for multiple TRPs each transmitting the PRS. According to various embodiments, when defining/configuring AP PRS triggering state(s), the network may configure a group of TRPs each transmitting the PRS to be aperiodically triggered by one AP PRS triggering state in order to trigger PRSs transmitted from multiple TRPs at once.

(AP Triggering Time Offset)

According to various embodiments, when performing AP triggering on multiple TRPs at once, the network may configure/indicate to the UE an independent AP triggering slot/symbol offset for each TRP, where the AP triggering is performed. Additionally/alternatively, according to various embodiments, the network may configure/indicate the same AP triggering slot/symbol offset for each TRP.

According to various embodiments, the network may simultaneously trigger PRSs transmitted from one or multiple physical cells.

For example, it may be assumed that AP PRS triggering state(s) are configured for each TRP. The configuration of AP triggering state(s) (AP_PRS_Trigger_State) may be additionally included in a higher layer signaling parameter "NR-DL-PRS-AssistanceDataPerTRP-r16" that includes information on all PRS configurations associated with to a specific TRP (see Table 7). The configuration may be associated with a specific code point such that the AP triggering state(s) are triggered by DCI.

TABLE 7

```
NR-DL-PRS-AssistanceDataPerTRP-r16 :: = SEQUENCE {
dl-PRS-ID-r16                        INTEGER (0..255),
nr-PhysCellID-r16                    NR-PhysCellID-r16
   OPTIONAL, -- Need ON
nr-CellGlobalID-r16                  NCGI-r15
   OPTIONAL, -- Need ON
nr-ARFCN-r16                         ARFCN-ValueNR-r15
   OPTIONAL, -- Cond NotSameAsRefServ
nr-DL-PRS-SFN0-Offset-r16         NR-DL-PRS-SFN0-Offset-r16,
nr-DL-PRS-expectedRSTD-r16        INTEGER (−3841..3841),
nr-DL-PRS-expectedRSTD-uncertainty-r16
INTEGER (−246..246),
nr-DL-PRS-Info-r16                   NR-DL-PRS-Info-r16,
AP_PRS_Trigger_State              INTEGER (0 . . . 3)
...
}
```

Referring to Table 7, the AP triggering state(s) (AP_PRS_Trigger_State) may be configured/indicated as integer values (e.g., 0, . . . , 3), which may be triggered in association with a specific code point of DCI.

Various embodiments may be extended/applied such that specific PRS resource set(s) and/or specific PRS resource(s) transmitted from a specific TRP are triggered.

(Hierarchical Configuration Method)

According to various embodiments, the network may select/indicate TRP(s) first and then select/indicate PRS resource set(s) and/or PRS resource(s) configured for the selected/indicated TRP(s). For example, among AP triggering state(s) for TRP(s) greater than or equal to 2^K, K (>=1) bits may be used to select/indicate specific TRP(s) in DCI. Among AP triggering state(s) for PRS resource set(s)/resource(s) greater than or equal to 2^L, L (>=1) bits may be used to select/indicate a specific PRS resource set and/or a specific PRS resource in DCI.

Since the number of TRPs may be large (more than or equal to a predetermined level), the selection/indication of the TRP(s) may need to be limited to the K bits. Additionally/alternatively, when the TRP(s) are selected/indicated by the K bits, it may be allowed to select/indicate not only one TRP but also a set of TRPs. For example, the K bits may be used to indicate a combination of TRPs (and/or TRP selection states) for triggering the AP PRS.

For example, a specific parameter TRP_selection_state may include one specific TRP (for example, when K=6 bits and when the K bits are 011110, TRP #1/#2/#3/#4 may be selected, which may be understood in the form of a bitmap). Alternatively, TRP_selection_state may include three specific TRPs.

Assuming that the maximum number of TRP IDs is 256 or more, 8 bits may be required to represent that one specific TRP among 256 TRPs is triggered. A larger number of bits may be required to trigger multiple TRPs. Thus, according to various embodiments, triggering (or triggered) state(s) for TRP(s) may be generated and configured by RRC/LPP, and then the use of a specific one of the triggering state(s) may be configured/indicated by a MAC-CE.

PRSs may be transmitted from multiple TRPs. For 256 TRPs, up to two PRS resource sets may be configured for each TRP, and each PRS resource set may include 64 PRS resources. For example, for AP PRS triggering, 512 triggering states (9 bits) may be required to provide different triggering states for each PRS resource set configured for each TRP. Additionally/alternatively, since all four frequency layers are required to support AP triggering for positioning frequency layer(s), 11 bits may be required in consideration of the maximum number of required state(s). However, this may cause an increase in DCI overhead. Thus, AP triggering state(s) may need to be defined for each positioning frequency layer, each TRP, and each resource set/resource, rather than defining/configuring the AP triggering state(s) in consideration of all positioning frequency layers, TRPs, and PRS resource sets/resources.

To aperiodically trigger specific PRS resource set(s)/resource(s) transmitted in specific positioning frequency layer(s) and/or specific TRP(s), triggering may need to be performed by distinguishing positioning frequency layer(s), TRP(s), and PRS resource set(s)/resource(s).

The following may be proposed by extending the various embodiments described above in consideration of the positioning frequency layer.

Proposal:

(Independent Triggering Including Positioning Frequency Layer)

According to various embodiments, for AP PRS triggering, a positioning frequency layer where the PRS is configured may be selected/indicated. Additionally/alternatively, according to various embodiments, TRP(s) may be selected/indicated. Additionally/alternatively, according to various embodiments, PRS resource set(s) and/or PRS resource(s) may be selected/indicated. According to various embodiments, the selection/indication of positioning frequency layer(s), TRP(s)/physical cell(s), and/or PRS resource(s)/PRS resource set(s) may be independently performed. The selection/indication may be configured hierarchically/sequentially.

Selection/Indication of Positioning Frequency Layer(s): AP Triggering State(s) Configuration/Indication for Positioning Frequency Layer(s)

According to various embodiments, AP PRS triggering state(s) may be defined/configured at the level of positioning frequency layer(s). According to various embodiments, the triggering state(s) may configure/indicate which positioning frequency layer(s) are aperiodically triggered. According to various embodiments, a specific PRS and/or all PRSs transmitted in the aperiodically triggered positioning frequency layer(s) may be aperiodically triggered by the above configuration.

For example, a specific AP triggering state may indicate positioning frequency layers #1 and #4. In this case, AP triggering may be performed on specific TRP(s), specific PRS resource set(s), and/or PRS resource(s), which are configured for positioning frequency layers #1 and #4.

According to various embodiments, when specific state(s) for positioning frequency layer(s) are triggered for the UE, and when state(s) and/or PRS resource(s)/resource set(s) are not triggered for a TRP, AP triggering may be performed on all PRSs configured for specific positioning frequency layer(s), which are indicated by the specific state(s) for the positioning frequency layer(s).

Selection/Indication of TRP(s) within a Positioning Frequency Layer: AP Triggering State(s) Configuration/Indication for TRP(s)

According to various embodiments, AP PRS triggering state(s) may be defined/configured at the level of TRP(s) each transmitting the PRS. According to various embodiments, the triggering state(s) may configure/indicate which TRP(s) are aperiodically triggered. According to various embodiments, a specific PRS and/or all PRSs transmitted in the aperiodically triggered TRP(s) may be aperiodically triggered by the above configuration.

According to various embodiments, when specific state(s) for TRP(s) are triggered for the UE, and when no PRS resource(s)/resource set(s) are triggered, AP triggering may be performed on all PRSs configured for specific TRP(s), which are indicated by the specific state(s) for the TRP(s).

Selection/Indication of PRS Resource Set(s) within a TRP: AP Triggering State(s) Configuration/Indication for PRS Resource Set(s)

According to various embodiments, AP PRS triggering state(s) may be defined/configured at the level of PRS resource set(s), which is transmitted by a specific TRP transmitting the PRS. According to various embodiments, the triggering state(s) may configure/indicate which PRS resource set(s) are aperiodically triggered. According to various embodiments, a specific PRS and/or all PRSs transmitted on the aperiodically triggered PRS resource set(s) may be aperiodically triggered by the above configuration.

Selection/Indication of PRS Resource(s) within a PRS Resource Set: AP Triggering State(s) Configuration/Indication for PRS Resource(s)

According to various embodiments, the network may configure/indicate AP triggering state(s) for specific PRS resource(s) to the UE. According to various embodiments, AP triggering may be performed on PRS resource(s) indicated by the triggering state(s).

Additionally/alternatively, according to various embodiments, joint-encoding may be considered for AP PRS triggering, without separately indicating positioning frequency layer(s), TRP(s), and PRS resource set(s)/resource(s).

For example, a method of configuring to perform AP triggering on all PRS resource sets transmitted by specific TRP(s) with one AP PRS triggering state, instead of discriminating AP PRS triggering state(s) at all the levels of positioning frequency layer(s), TRP(s), and PRS resource set(s)/resource(s) may be considered.

(Joint Triggering of Frequency-Layer/TRP/PRS)

According to various embodiments, one or more and/or all of the following items may be defined/configured/indicated by AP triggering state(s) for the UE through higher layer signaling. If a specific triggering state is indicated to the UE in DCI, AP triggering may be performed on frequency layer(s), TRP(s), and PRS resource set(s)/resource(s) included in the state.

Positioning frequency layer(s),

TRP(s)/gNB(s) associated with each positioning frequency layer

PRS resource set(s) and/or PRS resource(s) associated with each TRP/gNB.

According to various embodiments, at least one of the items may be jointly triggered. For example, information on at least one of positioning frequency layer(s), TRP(s), PRS resource set(s), or PRS resource(s) to be triggered may be included in a specific triggering state.

According to various embodiments, the network may configure to the UE a specific DCI code point in association with AP triggering state(s). According to various embodiments, the network may indicate the AP triggering state(s) to the UE in specific DCI.

(AP Triggering PRS Resource/Resource Set Only)

According to the various embodiments described above, triggering may be directly indicated for positioning frequency layer(s) and/or specific TRP(s) each transmitting the PRS. However, according to various embodiments, triggering state(s) may be defined only for PRS resource set(s) and/or PRS resource(s), and AP triggering may be performed thereon.

For example, the network may configure triggering state(s) (e.g., 0, 1, 2, 3, etc.) for every PRS resource set(s) and/or PRS resource(s). If the network indicates a specific triggering state (provided by a DCI code point) to the UE, the network may aperiodically trigger all PRS resource sets and/or PRS resources for which the triggering state is configured.

According to various embodiments, all the PRS resource sets and/or PRS resources may refer to PRS resource set(s) and/or PRS resource(s) configured in association with all positioning frequency layer(s) and/or TRP(s).

According to various embodiments, the network may preconfigure/predefine positioning frequency layer(s) and/or TRP(s), on which AP PRS triggering is to be performed, for the UE (the positioning frequency layer(s) and/or TRP(s) may mean some of all PRSs configured/provided by positioning-SIB/LPP). Then, the network may aperiodically trigger only PRS resource set(s) and/or PRS resource(s) associated with the defined/configured frequency layer(s) and/or TRP(s). According to various embodiments, AP triggering state(s) may be configured only at the level of PRS resource set(s) and/or PRS resource(s).

According to various embodiments, the network may configure AP PRS triggering state(s) to the UE through higher layer signaling such as RRC and/or LPP. The network may associate some or all of the triggering (or triggered) state(s) configured through the higher layer signaling with specific DCI code point(s) through MAC-CE signaling. According to various embodiments, the AP PRS triggering state(s) may refer to some or all of triggering state(s) for frequency layer(s), triggering state(s) for TRP(s) each transmitting the PRS, and triggering state(s) for PRS resource set(s) and/or PRS resource(s).

Hereinafter, the various embodiments described above will be described with reference to FIGS. 14 and 15.

FIG. 14 is a diagram illustrating exemplary AP PRS triggering according to various embodiments.

FIG. 15 is a diagram illustrating exemplary AP PRS triggering according to various embodiments.

In Example #1 of FIG. 15, different indication bit fields may be used to indicate positioning frequency layer(s), TRP(s), and PRS resource set(s)/resource(s). In Example #2 of FIG. 15, a single (integrated) bit field may be used to indicate positioning frequency layer(s), TRP(s), and PRS resource set(s)/resource(s). For example, each bit field may be interpreted as a bitmap. The PRS resource set of FIG. 15 may be replaced with a PRS resource and/or a PRS resource set and PRS resource.

FIGS. 14 and 15 shows examples in which the network aperiodically triggers, for the UE, PRS resource set(s)/resource(s) transmitted from TRP #1 and TRP #3 of frequency layer #1. It may be assumed that a total of 8 TRPs are configured on frequency layer #1, and two PRS resource sets are configured for each TRP. One or multiple PRS resources may be configured for each RPRS resource set. When the PRS resource set is aperiodically triggered, all PRS resources may be transmitted.

In Example #1 of FIG. 15, four bits may be used to indicate frequency layer(s). A frequency layer corresponding to a bit of 1 may be triggered. Frequency index #1 may correspond to the left most significant bit (MSB) of a bitmap. In Example #1, "1000" may be provided to the UE to indicate frequency layer #1.

In addition, 8 bits may be used for TRP indication. "10100000" may be provided to indicate TRP #1 and TRP #3. "10" may be indicated to configured/indicate a PRS resource set configured in association with each TRP. The bitmap may be indicated/configured/defined by a DCI code point. AP triggering states configured in association with the code point may be indicated. As in Example #1, AP triggering state(s) for frequency layer(s), AP triggering state(s) for TRP(s), and AP triggering state(s) for PRS resource set(s) may all be configured separately. DCI corresponding to the AP triggering state may be indicated at each level. For example, a series of DCI formats 1 related to DL transmission may be used.

If positioning frequency layer(s), TRP(s), and PRS resource(s) are indicated by independent bit fields, overhead may increase. Referring to Example #2 of FIG. 15, positioning frequency layer(s), TRP(s), and PRS resource set(s)/resource(s) may be indicated by one bitmap. In this case, it may be necessary to jointly encode positioning frequency layer(s), TRP(s), and PRS resource set(s)/resource(s) on which AP triggering is performed according to the bitmap and configure/indicate the jointly encoded positioning frequency layer(s), TRP(s), and PRS resource set(s)/resource(s) to the UE.

In the examples, referring to FIG. 14, the network may indicate 1100 to the UE as a code point for indicating frequency layer(s) in order to aperiodically trigger frequency layer #1 and frequency layer #2.

The above-described example may correspond to an example of various embodiments, and thus, variations/applications of the example may be included in various embodiments. For example, AP PRS triggering may be performed by indicating only TRP(s) and PRS resource set(s), without a process for selecting/indicating frequency layer(s). In this case, according to various embodiments, it may be defined/promised/configured that the network and UE trigger PRS(s) configured in association with specific frequency layer(s).

Various embodiments may be applied/extended not only to a DL PRS but also to a UL PRS aperiodically transmitted by the UE. For example, in the above proposal, it may be considered that the UE transmits the UL PRS to a specific TRP/BS, instead of performing reception from the specific TRP/BS.

3.2. AP PRS Association with PRS Reporting

Approach #2: AP PRS Transmission Triggering Associated with AP PRS Reporting Triggering In UE-network-assisted positioning, the UE may calculate its location and report positioning measurements to the network. Thus, according to various embodiment, for UE positioning based on the UE-assisted positioning, it may be necessary to indicate AP PRS triggering in association with PRS positioning reporting. In Section 3.2, various embodiments related thereto will be proposed.

According to the conventional standards, positioning measurement reporting may be configured/indicated through LPP signaling rather than RRC signaling. It may be difficult to support AP PRS triggering/reporting based on UE's positioning measurement reporting procedures and/or methods for the LPP supported by the conventional standards as they are. In various embodiments, methods of supporting AP PRS triggering/reporting based on RRC signaling and/or DCI will be proposed in consideration thereof. Additionally, methods of supporting the AP PRS by modifying/improving conventional LPP signaling will also be proposed.

AP PRS with Reporting Configuration by RRC

According to various embodiments, a method of using RRC signaling to configure AP PRS triggering state(s) and PRS measurement reporting may be considered. According to various embodiments, it may be necessary to support a positioning measurement reporting configuration for the UE through RRC signaling. To this end, the following may be considered.

Proposal (Reporting Configuration)

According to various embodiments, the BS may configure the positioning measurement reporting operation of the UE through RRC signaling. For example, a higher layer signaling parameter "Positioning-Reporting-Configuration" may be defined as one RRC signaling parameter. The parameter Positioning-Reporting-Configuration may be defined as some and/or all of the following parameters, which may be configured/indicated by the network to the UE. The names of parameters above and below are merely exemplary, and thus the parameters and names may be modified.

- ID for positioning reporting configuration: The UE may be configured with one or more parameters Positioning-Reporting-Configuration, and thus IDs thereof may be required to distinguish the parameters.
- Reporting behavior in time-domain
  - Periodic reporting
  - Semi-persistent reporting
  - Aperiodic reporting
- Resolution of reporting contents
  - For example, # of Bits, quantization level(s), accuracy level(s),
- UE Rx/Tx beam and/or UE Rx/Tx panel information
  - The UE Rx/Tx beam and/or UE Rx/Tx panel information may be configured/indicated in two different directions.
    - Configuration/indication of UE Rx/Tx beam and/or UE Rx/Tx panel information to be used by UE: The UE may be configured/instructed to report specific reporting contents. The reporting contents may correspond to one and/or all of the positioning measurements, and the UE may be configured/indicated with specific Rx/Tx beam and/or Rx/Tx panel information to be used by the UE to obtain the measurements.
- Reporting information/contents:
  - Positioning measurement(s) that need to be reported by UE(s).
    - RSTD
    - UE Rx−Tx time difference
    - RSRP
    - SNR/SINR
    - AoA (Angle of Arrival)
    - AoD (Angle of Departure)
    - Scatter information
    - None: For example, "none" may mean that the UE has no reporting contents to report to the network. That is, the network may configure/instruct the UE not to report anything. Although the UE is configured/indicated with a reporting configuration, the UE may be instructed/configured not to report any positioning measurement(s). The network may configure/indicate to the UE that the reporting information/contents are required only in the UE-based positioning mode.
  - Timing error(s): For example, network time synchronization error(s)
    - Time synchronization error information of different TRP(s) and/or gNB(s)
    - It may be interpreted to mean that the BS instructs the UE to report information on time synchronization errors that the UE obtains for different TRPs and/or gNBs/BSs.
  - Information related to DL/UL PRS: The information may mean information on a DL/UL RS to be used by the UE to acquire the reporting information/contents. For example, the information may include a DL PRS/CSI-RS/SSB, a UL PRS (e.g., SRS for positioning), a normal SRS, and RACH signals (RACH occasion(s), RACH preamble(s), etc.).
    - DL/UL PRS resource set(s) and/or DL/UL PRS resource(s) information: For example, the information may include DL PRS resource set ID(s) and/or DL PRS resource ID(s). When the UE is indicated/configured with information on PRS resource set(s) and/or PRS resource(s), the UE may report positioning measurements configured for the PRS resource set(s) and/or PRS resource(s). The UE may report to the network which PRS resource set(s) and/or PRS resource(s) are used together to obtain the measurements. For example, a UL PRS may include an SRS for positioning configured for UE positioning. Considering that the PRS resource set(s) and/or PRS resource(s) are configured in association with specific positioning frequency layer(s) and specific TRP(s), information on positioning frequency layer(s) and/or information on TRP(s) (e.g., TRP ID(s)) transmitting the PRS resource set(s) and/or PRS
resource(s) may be included in the report, in addition to PRS resource set ID(s) and/or PRS resource ID(s).

Positioning frequency layer(s) information: For example, the information may include a positioning frequency layer index (or indices). The information may be configured/provided to the UE through a positioning system information block (SIB) or configured to the UE based on the LPP. The information may refer to information on positioning frequency layer(s) in which DL PRS resource set(s) and/or PRS resource(s) are transmitted.

TRP(s) information: For example, the information may include TRP ID(s). The TRP ID(s) may be associated with each positioning frequency layer. The information may mean information on TRP(s) transmitting DL PRS resource set(s) and/or PRS resource(s).

Cell information: For example, the information may include physical/global cell ID(s). The information may mean information on cell(s) transmitting DL PRS resource set(s) and/or PRS resource(s).

Measurement averaging/calculation rule(s)

The rule(s) may mean rule(s) applied/used when the UE determines reporting contents to be reported in a DL/UL RS. Even if a specific positioning measurement (e.g., RSTD) is obtained from the RS multiple times, the reported RSTD value is a representative value, and thus the above rule(s) may be required.

A DL RS (e.g., PRS) and/or UL RS (e.g., SRS for positioning) may be used to obtain positioning measurements such as RSTD, UE Rx−Tx time difference, and PRS-RSRP. For example, in the case of a periodic PRS, the UE may calculate a positioning measurement by receiving the PRS that is periodically transmitted. Information on measurement averaging/calculation rule(s) may instruct the UE to determine a positioning measurement to be reported by the UE based on a PRS that is recently received N times (where N>=1). Additionally/alternatively, other rules/regulations/criteria may be configured/indicated. For example, a specific time window (averaging window) may be configured, and the UE may be configured/instructed to average positioning measurements received and/or obtained within the window and report a single value.

In the case of aperiodic reporting, the UE may be configured/instructed to report a positioning measurement obtained from the most recently received DL RS (e.g., specific PRS resource(s) and/or specific PRS resource set(s)) and/or the most recently received UL RS (e.g., specific SRS resource(s) and/or SRS resource set(s)). Additionally/alternatively, the reporting operation of the UE may be promised/configured/defined between the UE and network by default.

The rule(s) may be configured/indicated independently for periodic reporting, semi-persistent (SP) reporting, and/or aperiodic (AP) reporting indication.

Proposal (AP PRS Triggering Associated with Reporting Configuration)

According to various embodiments, the UE may receive AP PRS triggering state(s) and/or a list/set of AP PRS triggering state(s) from the network through higher layer signaling such as LPP/RRC. According to various embodiments, it may be configured/indicated to the UE that each AP PRS triggering state is associated with a code point composed of L signaling bits (where L>=1) of specific DCI format(s).

According to various embodiments, each AP PRS triggering state may be configured/indicated in association with specific "Positioning-Reporting-Configuration" according to various embodiments described above. AP triggering may be performed on specific positioning frequency layer(s), specific TRP(s), specific PRS resource set(s) and/or PRS resource(s), which are configured together with "Positioning-Reporting-Configuration" (or which are included in Positioning-Reporting-Configuration as sub-parameters thereof).

[Joint Triggering of AP PRS and AP SRS]

According to various embodiments, when a UE Rx−Tx time difference measurement is included/indicated/configured (by the network to the UE) as reporting content(s) of specific Positioning-Reporting-Configuration associated with specific AP triggering state(s), a specific AP PRS (PRS resource set(s) and/or PRS resource(s)) and a specific AP SRS (SRS resource set(s) and/or SRS resource(s)) may be jointly triggered.

AP PRS with Reuse of Reporting Configuration by LPP

In the previous section, the methods of introducing the AP PRS with RRC and DCI have been described. In this section, various embodiments of introducing the AP PRS by utilizing/extending/modifying LPP signaling provided to the UE for positioning measurement reporting based on the LPP will be described.

According to the conventional standards, when the location server instructs the UE to report positioning measurements, the UE may not be allowed to report positioning measurement(s) for specific PRS(s) (e.g., PRS resource set(s), PRS resource(s), TRP(s), and/or frequency layer(s)).

Approach #2-1: Reporting Triggering for Positioning Technique/Measurement in Separate DCI According to various embodiments, to configure/indicate a PRS on which AP PRS triggering and/or aperiodic PRS reporting is to be performed, AP triggering state(s) for specific positioning frequency layer(s), specific TRP(s), specific PRS resource set(s), and/or specific PRS resource(s) may be used as described in the previous section "AP PRS triggering without association with PRS reporting".

According to various embodiments, specific positioning technique(s) may be configured/indicated in specific DCI together with or independently of the AP PRS triggering. According to various embodiments, the UE may use "Provide-Location-Information" and/or "Signal-Measurement-Information" configured (from the network) as a "reporting container" corresponding to the positioning technique and/or positioning measurement indicated by the AP triggered PRS in order to report positioning measurements (see TS 37.355).

For example, two bits may be used to indicate a measurement report for the specific positioning technique for AP PRS triggering. The two bits may be mapped to positioning measurements/positioning techniques as follows.

DL-TDOA technique/RSTD: 00

Multi-RTT technique/UE Rx−Tx time difference: 01

DL-AoD technique/RSRP (and/or PRS resource set/resource index): 10

No_report: 11

According to various embodiments, the UE may perform measurement for a PRS indicated by AP PRS triggering state(s) and also report measurements for a positioning technique indicated together and/or separately in DCI. For example, it may be assumed that the AP PRS triggering state(s) are configured for each TRP. Referring to Table 8, it may be configured by NR-DL-PRS-AssistanceDataPerTRP that all PRS resource sets and/or PRS resources, which are additionally transmitted by the TRP, are aperiodically triggered as follows. Details thereof may be found in various embodiments described above with reference to Table 7.

TABLE 8

```
NR-DL-PRS-AssistanceDataPerTRP-r16 ::= SEQUENCE {
dl-PRS-ID-r16                        INTEGER (0..255),
nr-PhysCellID-r16                    NR-PhysCellID-r16
  OPTIONAL, -- Need ON
nr-CellGlobalID-r16                  NCGI-r15
  OPTIONAL, -- Need ON
nr-ARFCN-r16                         ARFCN-ValueNR-r15
  OPTIONAL, -- Cond NotSameAsRefServ
nr-DL-PRS-SFN0-Offset-r16         NR-DL-PRS-SFN0-Offset-r16,
nr-DL-PRS-expectedRSTD-r16        INTEGER (−3841..3841),
nr-DL-PRS-expectedRSTD-uncertainty-r16
INTEGER (−246..246),
nr-DL-PRS-Info-r16                   NR-DL-PRS-Info-r16,
AP_PRS_Trigger_State              INTEGER (0 . . . 3)
. . .
}
```

According to various embodiments, the network may aperiodically trigger all PRS resources transmitted by a specific TRP by indicating to the UE a code point corresponding to the AP PRS triggering state. Additionally/alternatively, according to various embodiments, a specific positioning measurement/positioning technique may be configured/indicated by DCI as in various embodiments described above in order to indicate positioning reporting contents (or measurement reporting contents) for the PRS.

Approach #2-2

According to various embodiments, a reporting request signal ("Request-Location-Information") of the LPP may be modified such that AP PRS triggering state(s) may be configured in association with a report request (Request-Location-Information) of the LPP.

According to various embodiments, the location server may transmit LPP signaling/message ("Request-Location-Information") to instruct/request the UE to report positioning measurement information. For example, the location server may transmit "NR-DL-TDOA-RequestLocationInformation" to the UE to measure the location of the UE based on the DL-TDOA positioning technique. In the description of various embodiments, "Request-Location-Information" may include not only DL-TDOA but also "Request-Location-Information" for all positioning techniques supported by the LPP.

Table 9 shows Request-Location-Information for DL-TDOA defined in TS 37.355.

TABLE 9

IE NR-DL-TDOA-RequestLocationInformation is used by the location server to request NR DL-TDOA location measurements from a target device.

```
-- ASN1START
NR-DL-TDOA-RequestLocationInformation-r16 : : = SEQUENCE {
  nr-DL-PRS-RstdMeasurementInfoRequest-r16          ENUMERATED { true }
    OPTIONAL, -- Need ON
  nr-RequestedMeasurements-r16                       BIT STRING
{ prsrsrpReq (0) } (SIZE (1..8)),
  nr-AssistanceAvailability-r16                      BOOLEAN,
  nr-DL-TDOA-ReportConfig-r16                        NR-DL-TDOA-
ReportConfig-r16 OPTIONAL, -- Need ON
  additionalPaths-r16
  ENUMERATED { requested }                         OPTIONAL, -- Need ON
  ...
}
NR-DL-TDOA-ReportConfig-r16 ::= SEQUENCE {
  maxDL-PRS-RSTD-MeasurementsPerTRPPair-r16          INTEGER (1..4)
    OPTIONAL, -- Need ON
  timingReportingGranularityFactor-r16               INTEGER (0..5)
    OPTIONAL, -- Need ON
  ...
}
-- ASN1STOP
```

According to various embodiments, the network may instruct the UE not to report positioning measurements for any specific PRS resource set(s) and/or any specific PRS resource(s) transmitted in any positioning frequency layer(s) and/or any TRP(s) through Request-Location-Information signaling. For the RSTD, the location server may indicate to the UE the reporting granularity and/or the maximum number of reported RSTD measurements for specific TRP pair(s). According to various embodiments, for a PRS provided through assistance data, the UE may report all and/or some of the positioning measurements for PRS resource set(s) and PRS resource(s) transmitted in physical cell(s) and/or TRP(s) measured by the UE.

According to various embodiments, to indicate AP PRS triggering and/or reporting, positioning frequency layer(s), TRP(s), and/or PRS resource(s) on which AP triggering is to be performed may be included in Request-Location-Information, which may be driven in association with AP triggering state(s). This will be described in detail below.

Proposal

According to various embodiments, the location server may provide/transmit at least one of the following contents/information by additionally including the at least one of the following contents/information in "Request-Location-Information", which is transmitted to request/configure/instruct the UE to report specific positioning measurements.

For PRS:

(1) Positioning frequency layer(s) information (e.g., ID)

(2) TRP(s) information/index/ID for each positioning frequency layer (3) PRS resource set(s) information/ID and/or PRS resource(s) information/ID associated with each TRP (4) AP PRS triggering time-offset(s) (e.g., slot-offset(s))

Specific SSB block index (or indices)

CSI-RS resource ID(s)

The following defined in TS37.355 may be considered as an example of "Request-Location-Information". That is, the above contents may be added to "Request-Location-Information" as follows.

NR-DL-TDOA-RequestLocationInformation-r16: DL-TDOA technique

NR-DL-AoD-RequestLocationInformation-r16: DL-AoD technique

NR-Multi-RTT-RequestLocationInformation-r16: Multi-RTT technique

NR-ECID-RequestLocationInformation-r16

Various embodiments described above may be applied to other techniques including positioning techniques supported for LTE positioning as well as NR positioning techniques.

According to various embodiments, upon AP PRS triggering and/or AP reporting triggering, the UE may report measurements for the PRS resource set(s) and/or PRS resource(s) transmitted by the TRP(s) on the positioning frequency layer(s).

According to various embodiments, the UE may recognize that the PRS resource set(s) and/or PRS resource(s) transmitted by the TRP(s) on the positioning frequency layer(s) are the AP triggered PRS (see (4) for PRS).

According to various embodiments, the AP PRS triggering time offset(s) may be configured at the level/unit of positioning frequency layer(s), TRP(s), PRS resource set(s), and/or PRS resource(s).

According to various embodiments, upon AP reporting triggering based on NR-ECID technique(s), the UE may report measurements for the specific SSB block indices (or indices) and/or CSI-RS resource ID(s) to the network.

Proposal ##

According to various embodiments, the UE may receive AP PRS triggering state(s) and/or a list/set of AP PRS triggering state(s) from the network through higher layer signaling such as LPP/RRC.

According to various embodiments, it may be configured/indicated that each AP PRS triggering state is associated with a code point composed of L signaling bits (where L>=1) of specific DCI format(s).

According to various embodiments, it may be indicated/configured to the UE that each AP PRS triggering state is associated with "Request-Location-Information" described above, and more particularly, one and/or multiple parameters "Request-Location-Information", where the additional parameters proposed above are introduced.

For example, request location information on the DL-TDOA and multi-RTT techniques may be configured in association with a specific AP PRS triggering state.

The association is shown in the example of Table 10.

TABLE 10

```
Positoning-AperiodicTriggerState_List : := SEQUENCE (SIZE (1..4))
OF
Positoning-AperiodicTriggerState
Positoning-AperiodicTriggerState ::= SEQUENCE {
   NR-DL-TDOA-RequestLocationInformation-r17
   NR-Multi-RTT-RequestLocationInformation-r17
   Time-offset (e.g., slot (s) offset)
      ...
}
```

Referring to the example in Table 10, "Positoning-AperiodicTriggerState_List" may be configured with two bits (through LPP or RRC), and for "Positoning-AperiodicTriggerState", a total of four parameters may be configured. an AP PRS triggering state may be related to the parameter "Positoning-AperiodicTriggerState". Specific "Positoning-AperiodicTriggerState" may be indicated/configured in a specific DCI format. To indicate the AP PRS triggering state, the index of specific "Positoning-AperiodicTriggerState" in "Positoning-AperiodicTriggerState_List" may be associated with a specific DCI code point and then provided to the UE. Assuming that a 2-bit DCI code point is used due to the total four parameters Positoning-AperiodicTriggerStates, it may be considered that four states are indicated by DCI code points: 00, 01, 10, and 11.

The following parameters, which are mentioned in the above-described examples, are obtained by appending additional information to Request-Location-Information in the prior art as proposed in various embodiments. The names are merely exemplary and thus, the present disclosure is not limited thereto.

NR-DL-TDOA-RequestLocationInformation-r17

NR-Multi-RTT-RequestLocationInformation-r17

According to various embodiments, the UE may identify a PRS to which AP triggering will be applied and a PRS to which AP reporting triggering will be applied, based on the following information included in Request-Location-Information.

Positioning frequency layer(s) information (e.g., ID)

TRP(s) information/index/ID for each positioning frequency layer

PRS resource set(s) information/ID and/or PRS resource(s) information/ID associated with each TRP When the method of introducing LPP signaling is used as described above in the methods according to various embodiments, it may be necessary to configure AP triggering slot offset(s). The offset(s) may be configured/indicated for every TRP(s), PRS resource set(s), and/or PRS resource(s). Additionally/alternatively, an offset parameter may be introduced into the AP triggering state such that the offset parameter is commonly used/applied to all AP triggered PRSs as described in this example ("Time-offset").

3.3. Joint Triggering AP PRS and AP SRS+"None"-Reporting (for UE-Based)

Proposal: Joint Triggering of AP PRS and AP SRS

According to various embodiments, when triggering a specific AP SRS, the network may jointly trigger a specific AP PRS based on a specific DCI code point for AP SRS triggering. According to various embodiments, specific PRS resource set(s)/resource(s) may be configured to be used for the simultaneous AP triggering.

For example, AP triggering state(s) may be configured for specific PRS resource set(s)/resource(s), which may be configured in association with DCI signaling (e.g., code point) triggering AP SRS resource set(s)/resource(s). When the AP SRS is triggered with a specific DCI code point, the specific PRS resource set(s)/resource(s) may be triggered together.

According to various embodiments, the network may simultaneously trigger a specific AP PRS and a specific AP SRS based on specific AP PRS triggering state(s). To this end, the network may additionally define/configure/indicate AP triggering state(s) when configuring SRS resource set(s) and/or SRS resource(s), which may be configured to be associated with a DCI code point for AP PRS triggering. According to various embodiments, when the network indicates a specific AP PRS triggering state, specific SRS resource set(s) may be aperiodically triggered.

As a specific example, Table 11 may be referred to.

TABLE 11

```
SRS-PosResourceSet-r16 ::=                    SEQUENCE {
  srs-PosResourceSetId-r16                      SRS-PosResourceSetId-
r16,
  srs-PosResourceIdList-r16                     SEQUENCE
(SIZE (1..maxNrofSRS-ResourcesPerSet) ) OF SRS-PosResourceId-r16
OPTIONAL, -- Cond Setup
  resourceType-r16                              CHOICE {
    aperiodic-r16                                 SEQUENCE {
      aperiodicSRS-ResourceTriggerList-r16          SEQUENCE
(SIZE (1. .maxNrofSRS-TriggerStates-1))
                                                    OF INTEGER
(1..maxNrofSRS-TriggerStates-1) OPTIONAL, -- Need M
AperiodicSRS-Joint TriggerList-r17            SEQUENCE
(SIZE(1..maxNrofSRS- Joint TriggerStates-1))
                                                    OF INTEGER
(1..maxNrofSRS-Joint TriggerStates-1)
....
}
```

Referring to Table 11, AP triggering state(s) may be added to an SRS resource set configuration for positioning. For example, AperiodicSRS-Joint_TriggerList-r17 may be configured in association with AP PRA triggering state(s)/signaling. The SRS may mean an SRS configured for positioning.

The multi-RTT technique may be effectively supported by joint triggering for the PRS and SRS. Both UE Rx−TX time difference measurement(s) obtained by the UE for a DL RS (e.g., PRS) transmitted by the BS/TRP and gNB Rx−TX time difference measurement(s) obtained by the BS for a UL RS (e.g., SRS) transmitted by the UE may need to be used for the multi-RTT technique. Therefore, both the AP PRS and AP SRS may be required to obtain all measurements for the multi-RTT technique. According to various embodiments, signaling overhead may be reduced by triggering the AP PRS and AP SRS at once.

[Joint Triggering of AP PRS and AP SRS]

According to various embodiments, when the "UE Rx−Tx time difference measurement" is included/indicated/configured (by the network to the UE) as the reporting content of specific "Positioning-Reporting-Configuration" associated with specific AP triggering state(s), a specific AP PRS (PRS resource set(s) and/or PRS resource(s)) and a specific AP SRS (SRS resource set(s) and/or SRS resource(s)) may be jointly triggered.

Proposal: "None"-Reporting for UE-Based Positioning

In various embodiments, AP PRS triggering methods that considers the presence or absence of UE positioning measurement depending on the UE-based positioning mode and/or UE/network-assisted positioning mode and detailed technical properties necessary therefor have been described.

If positioning measurements do not need to be reported, only AP triggering state(s) may be configured and/or indicated for PRS resource set(s)/TRP(s)/frequency layer(s) as described above. If the AP PRS is supported in association with the reporting configuration, it may be considered to configured/indicate "none" among the reporting contents such that the UE reports no positioning measurement.

Proposal ##

According to various embodiments, the UE may receive AP PRS triggering state(s) and/or a list/set of AP PRS triggering state(s) from the network through higher layer signaling such as LPP/RRC.

According to various embodiments, it may be configured/indicated to the UE that each AP PRS triggering state is associated with signaling of specific DCI format(s) (e.g., a code point consisting of L bits (where L>=1)). According to various embodiments, specific "Positioning-Reporting-Configuration" described above may be configured/indicated in association with each AP PRS triggering state. According to various embodiments, "none" may be configured/indicated as the reporting contents by "Positioning-Reporting-Configuration" such that the UE reports no positioning measurements, in order to support the AP PRS in the UE-based mode.

3.4. Additional

[AP PRS Triggering Timeline Details]

In various embodiments described above, it may be considered to implement the triggering time for the AP PRS according to at least one of the following different methods.

1) Method 1

According to various embodiments, AP PRS triggering time/slot offset(s) may be configured at the level of PRS resource(s), PRS resource set(s), TRP(s), and/or positioning frequency layer(s).

According to various embodiments, upon receiving an AP PRS triggering DCI indication, the AP PRS may be transmitted after the configured time/slot offset(s).

For example, if the AP PRS triggering time/slot offset(s) are configured at the TRP level, the configured AP PRS triggering time/slot offset(s) may be equally applied/used to/for all PRS resource set(s) configured in association with a specific TRP. A DCI processing time of the UE may be added in addition to the slot offset(s). Additionally/alternatively, the DCI processing time of the UE may be included in the AP triggering time offset(s). To this end, it may be necessary for the UE to inform the network of the UE capability. An offset considering the DCI processing time may be configured based on the UE capability.

2) Method 2

According to various embodiments, methods operating in association with a transmission periodicity of PRS resource(s) and/or PRS resource set(s) may be considered. According to various embodiments, when the network indicates AP PRS triggering DCI through a specific DCI format for specific PRS resource(s) and/or PRS resource set(s) (or multiple PRS resource sets(s) configured in association with specific TRP(s) and specific frequency layer(s)), the PRS resource(s) and/or PRS resource set(s) may operate in association with a periodicity configured for the PRS resource(s) and/or the PRS resource set(s). For the PRS, a periodic PRS may be used/driven as the AP PRS, without configuring AP-dedicated PRS resource(s) and/or AP-dedicated PRS resource set(s) unlike the CSI-RS.

A. For example, it may be assumed that specific DL PRS resource set(s) are transmitted at a periodicity of X ms/slot(s) (where X>=1). When the DL PRS resource set(s) are aperiodically triggered by DCI at a specific time (e.g., at a time of X/2 ms/slot(s) between periods in which the PRS resource set is transmitted), DL PRS resource set(s) may be aperiodically triggered at a transmission time (transmission periodicity) of the DL PRS resource set(s) closest to the time when the DCI is indicated.

B. Additionally/alternatively, according to various embodiments, the processing capability of the UE may be considered.

Figure 16:
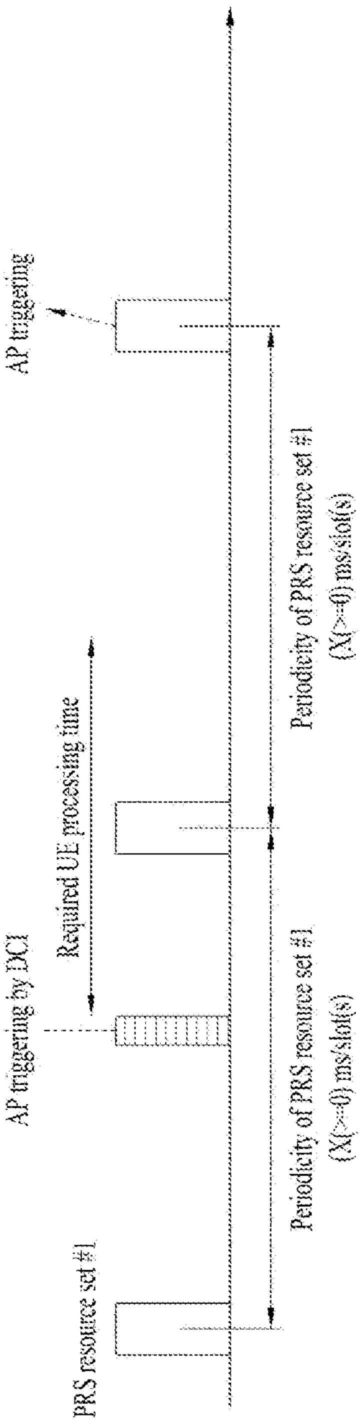
FIG. 16 is a diagram illustrating an exemplary AP PRS triggering timeline according to various embodiments.

FIG. 16 is a diagram illustrating an exemplary AP PRS triggering timeline according to various embodiments.

Referring to FIG. 16, a specific PRS resource set, PRS resource set #1 having a transmission periodicity of X ms/slot(s) may be assumed in the same way as described above (for example, PRS resource set #1 may be configured for a periodic PRS). PRS resource set #1 may be configured to be transmitted periodically.

When the UE receives AP triggering DCI for PRS resource set #1 from the BS, AP triggering may be performed at the closest time of transmitting PRS resource set #1 after the processing time of the UE. The UE processing time may be reported to the network as the capability of the UE. After specific PRS resource set(s) and/or specific PRS resource(s) are aperiodically triggered by DCI, AP triggering may be performed at the closest transmission time (transmission periodicity) of the PRS resource set(s) and/or PRS resource(s) after a specific threshold/time window (the threshold and/or time window may be related to the processing capability of the UE).

[Paging PDCCH Triggering AP PRS]

According to various embodiments, the network may use a paging PDCCH to aperiodically trigger specific PRS resource set(s) and/or specific PRS resource(s). Similarly to the description of various embodiments, the specific PRS resource set(s) and/or specific PRS resource(s) may be transmitted from specific multiple TRP(s) and/or multiple frequency layer(s). According to various embodiments, AP PRS triggering DCI may be supported by a PDCCH monitored with a paging radio network temporary identifier (P-RNTI). The UE may perform monitoring with the P-RNTI and receive triggering of a specific AP PRS over a paging PDCCH.

If AP PRS triggering DCI is supported by a PDCCH monitored with the P-RNTI, a specific UE group may recognize that AP PRS triggering is indicated by a paging PDCCH. In addition, the UE group may determine based on a paging PDSCH whether AP PRS triggering is for the UE group in a UE-specific manner. It may be difficult for a specific UE to determine whether the AP PRS is for the UE by receiving/decoding only a paging PDCCH.

[Difference DCI Format Depending on the Positioning Modes]

According to various embodiments, the AP PRS may be triggered by different AP PRS triggering formats depending on positioning modes.

For example, for the UE-assisted positioning mode, since the UE may need to report positioning measurements over a PUSCH, it may be indicated to the UE by UL DCI. For the UE-based positioning mode, the UE may not need to report positioning measurements over a PUSCH. In this case, it may be configured/indicated by DL DCI. The DL DCI and/or UL DCI may be determined in association with the positioning mode of the UE.

[AP PRS Processing and CSI Processing]

The AP PRS processing time may overlap with the CSI processing time for a periodic/semi-persistent/aperiodic (P/SP/AP) CSI-RS.

According to various embodiments, CSI processing and PRS processing may be considered together. Considering that the UE needs a time to process both the CSI processing and PRS processing, the UE may be configured/indicated (by the network) with a threshold/time window for a time of reporting CSI and/or PRS measurements. Additionally/alternatively, simultaneous processing UE capability for the CSI processing and PRS processing may be configured/defined. For example, the simultaneous processing UE capability may be defined/configured as a total of K RS resource(s) and/or RS resource set(s) for a specific time T (>=0), where K may be a value obtained by adding both the number of PRS resources and the number of CSI-RS resources (K_1+K_2<=K). K_1 may be the number of CSI computation units that may be processed, and K_2 may be the number of PRS computation units that may be processed.

(Joint processing) The UE may simultaneously perform CSI computation and PRS computation. The UE may process K_1 CSI resource(s) and/or CSI computation unit(s) for a specific time duration T (>=0). During the time duration T (>=0), the UE may process K_2 PRS resource(s) and/or PRS computation/processing unit(s). In this case, the UE may report the times T, K_1, and K_2 to the network through UE capability signaling, and the network may indicate/configure PRS and/or CSI processing to the UE in consideration of the reported times.

According to various embodiments, the priority between AP/SP/P PRS processing and AP/SP/P CSI processing may vary depending on situations.

If AP/SP/P PRS processing and AP/SP/P CSI processing timelines overlap, the UE may prioritize AP/SP/P CSI processing. CSI measurement(s)/computation(s)/reporting(s) are essential for effective data transmission and reception between the UE and BS, the CSI measurement(s)/computation(s)/reporting(s) may be more important than PRS measurement(s)/computation(s)/reporting(s) for UE positioning.

If AP/SP/P PRS processing and AP/SP/P CSI processing timelines overlap with each other, the UE may prioritize AP/SP/P PRS processing. PRS measurement(s)/computation(s)/reporting(s) for finding the location of the UE at a specific point in time may be more important than data transmission/reception between the UE and BS. For example, it may be important to accurately and quickly find the location of the UE and provide the UE location to the network in an emergency situation.

According to various embodiments, the network may configure/indicate to the UE priorities of AP/SP/P PRS processing and AP/SP/P CSI processing. According to various embodiments, the network may indicate to the UE that either the CSI or PRS has a higher priority for CSI measurement(s)/computation(s)/reporting(s) and PRS measurement(s)/computation(s)/reporting(s).

According to various embodiments, when AP PRS measurement(s)/computation(s)/reporting(s) overlap with SP/P CSI measurement(s)/computation(s)/reporting(s), the UE may prioritize PRS processing.

For example, what the network aperiodically indicates to the UE may be more important than what the network indicates to the UE semi-persistently/periodically, that is, the former may be required/requested to be processed quickly. Thus, PRS processing may have a high priority.

According to various embodiments, when AP CSI measurement(s)/computation(s)/reporting(s) overlap with SP/P PRS measurement(s)/computation(s)/reporting(s), the UE may prioritize CSI processing.

For example, what the network aperiodically indicates to the UE may be more important than what the network indicates to the UE semi-persistently/periodically, that is, the former may be required/requested to be processed quickly. Thus, CSI processing may have a high priority.

According to various embodiments, when SP PRS measurement(s)/computation(s)/reporting(s) overlap with P CSI measurement(s)/computation(s)/reporting(s), the UE may prioritize PRS processing.

For example, what the network semi-persistently indicates to the UE may be more important than what the network indicates to the UE periodically, that is, the former may be required/requested to be processed quickly. Thus, PRS processing may have a high priority.

According to various embodiments, when SP CSI measurement(s)/computation(s)/reporting(s) overlap with P PRS measurement(s)/computation(s)/reporting(s), the UE may prioritize CSI processing.

For example, what the network semi-persistently indicates to the UE may be more important than what the network indicates to the UE periodically, that is, the former may be required/requested to be processed quickly. Thus, CSI processing may have a high priority.

Figure 17:
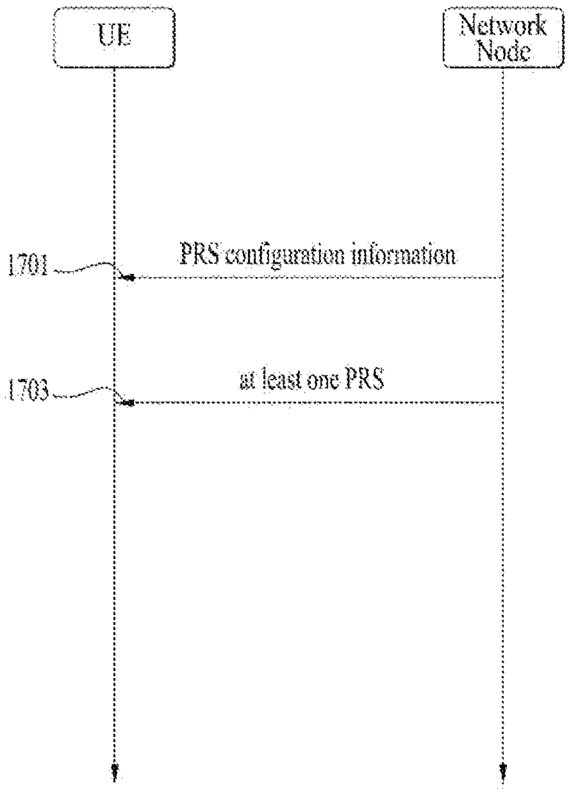
FIG. 17 is a diagram schematically illustrating a method of operating a UE and a network node according to various embodiments.

FIG. 17 is a diagram schematically illustrating a method of operating a UE and a network node according to various embodiments.

Figure 18:
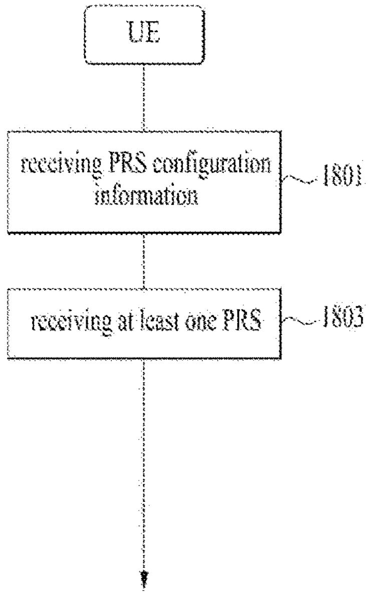
FIG. 18 is a flowchart illustrating a method of operating a UE according to various embodiments.

FIG. 18 is a flowchart illustrating a method of operating a UE according to various embodiments.

Figure 19:
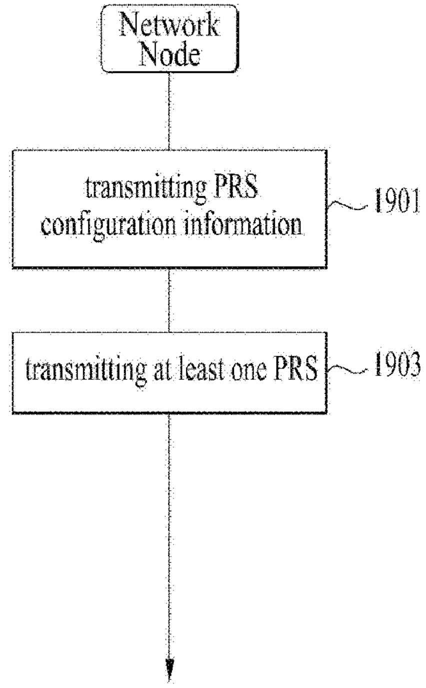
FIG. 19 is a flowchart illustrating a method of operating a network node according to various embodiments.

FIG. 19 is a flowchart illustrating a method of operating a network node according to various embodiments. For example, the network node may be a TP, a BS, a cell, a location server, an LMF, and/or any device performing the same operation.

Referring to FIGS. 17 to 19, in operations 1701, 1801, and 1901 according to various embodiments, the network node may transmit PRS configuration information, and the UE may receive the PRS configuration information.

In operations 1703, 1803, and 1903 according to various embodiments, the network node may transmit one or more PRSs, and the UE may receive the one or more PRSs.

According to various embodiments, the one or more PRSs may be aperiodically received based on receiving information on triggering an aperiodic PRS.

The operations of the UE and/or network node according to various embodiments may be explained and performed based on the details described in Sections 1 to 3.

It is obvious that each of the examples of the proposed methods may also be included as one embodiment, and thus each example may be regarded as a kind of proposed method. Although the proposed methods may be implemented independently, some of the proposed methods may be combined (or merged) for implementation. In addition, it may be regulated that information on whether the proposed methods are applied (or information on rules related to the proposed methods) needs to be transmitted from the BS to the UE in a predefined signal (e.g., a physical layer signal, a higher layer signal, etc.).

4. Exemplary Device Configurations for Implementing Various Embodiments

4.1. Exemplary Device Configurations to which Various Embodiments are Applied FIG. 20 is a diagram illustrating a device for implementing various embodiments.

Figure 20:
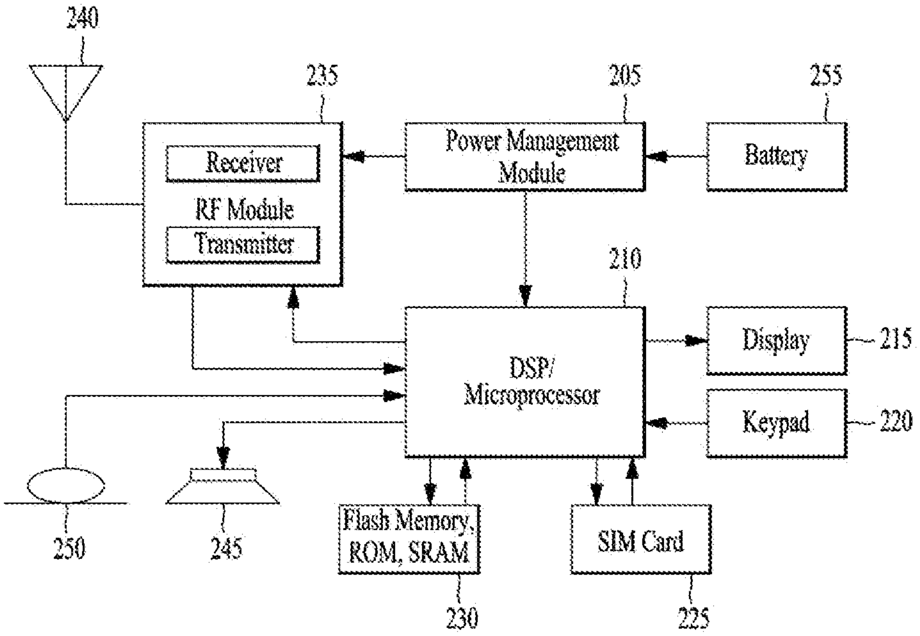
FIG. 20 is a diagram illustrating a device for implementing various embodiments.

The device illustrated in FIG. 20 may be a UE, a BS (e.g., eNB, gNB, or TP), and/or a location server (or LMF) that is adapted to perform the above-described mechanisms. Alternatively, the device may be any device for performing the same operation.

Referring to FIG. 20, the device may include a digital signal processor (DSP)/microprocessor 210 and a radio frequency (RF) module (transceiver) 235. The DSP/microprocessor 210 may be electrically connected to the transceiver 235 and configured to control the transceiver 235. The device may further include a power management module 205, a battery 255, a display 215, a keypad 220, a subscriber identity module (SIM) card 225, a memory device 230, an antenna 240, a speaker 245, and an input device 250, depending on the designer's choice.

In particular, the device shown in FIG. 20 shows a UE including a receiver 235 configured to receive a request message from a network and a transmitter 235 configured to transmit transmission/reception timing information to the network. The receiver and transmitter may constitute the transceiver 235. The UE may further include the processor 210 connected to the transceiver 235.

In addition, the device shown in FIG. 20 may represent a network device including a transmitter 235 configured to transmit a request message to a UE and a receiver 135 configured to receive transmission/reception timing information from the UE. The receiver and transmitter may constitute the transceiver 235. The network device may further include the processor 210 connected to the transmitter and receiver. The processor 210 may be configured to calculate latency based on the transmission/reception timing information.

According to various embodiments, a processor included in a UE (or a communication device included in the UE), a BS (or a communication device included in the BS), and/or a location server (or a communication device included in the location server) may be configured to operate as follows by controlling a memory.

According to various embodiments, the UE, BS, or location server may include: at least one transceiver; at least one memory; and at least one processor connected to the at least one transceiver and the at least one memory. The at least one memory may be configured to store instructions that cause the at least one processor to perform the following operations.

The communication device included in the UE, BS, or location server may be configured to include the at least one processor and the at least one memory. The communication device included in the UE, BS, or location server may be configured to include the at least one transceiver. When the communication device does not include the at least one transceiver, the communication device may be configured to be connected to the at least one transceiver.

The TP, BS, cell, location server, LMF, and/or any device performing the same operation may be referred to as a network node.

According to various embodiments, the at least one processor included in the UE (or at least one processor of the communication device included in the UE) may be configured to: receive PRS configuration information.

According to various embodiments, the at least one processor included in the UE may be configured to receive one or more PRSs based on the PRS configuration information.

According to various embodiments, based on reception of information on triggering an aperiodic PRS, the one or more PRSs may be aperiodically received.

According to various embodiments, the at least one processor included in the network node (or at least one processor of the communication device included in the network node) may be configured to transmit PRS configuration information.

According to various embodiments, the at least one processor included in the network node may be configured to transmit one or more PRSs related to the PRS configuration information.

According to various embodiments, based on transmission of information on triggering an aperiodic PRS, the one or more PRSs may be aperiodically transmitted.

Specific operations of the UE and/or the network node according to the above-described various embodiments may be described and performed based on Section 1 to Section 3 described before.

Unless contradicting each other, various embodiments may be implemented in combination. For example, (the processor included in) the UE and/or the network node according to various embodiments may perform operations in combination of the embodiments of the afore-described in Section 1 to Section 3, unless contradicting each other.

4.2. Example of Communication System to which Various Embodiments are Applied

Various embodiments have been mainly described in relation to data transmission and reception between a BS and a UE in a wireless communication system. However, various embodiments are not limited thereto. For example, various embodiments may also relate to the following technical configurations.

The various descriptions, functions, procedures, proposals, methods, and/or operational flowcharts of the various embodiments described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
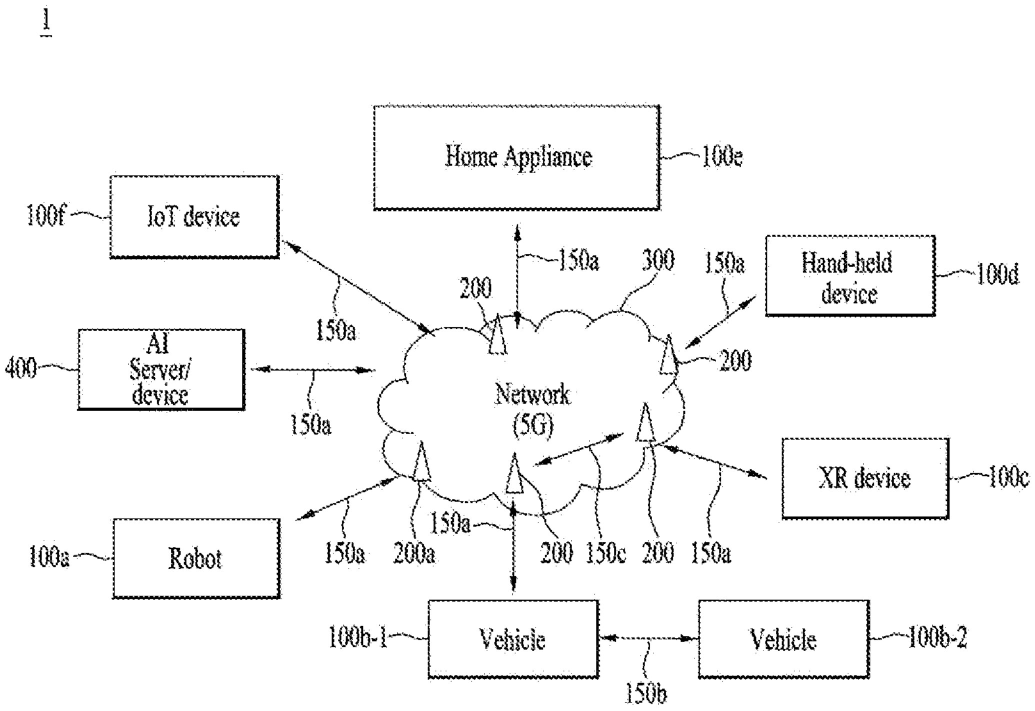
FIG. 21 illustrates an exemplary communication system to which various embodiments are applied.

FIG. 21 illustrates an exemplary communication system to which various embodiments are applied.

Referring to FIG. 21, a communication system 1 applied to the various embodiments includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments.

Example of Wireless Device to which Various Embodiments are Applied

Figure 22:
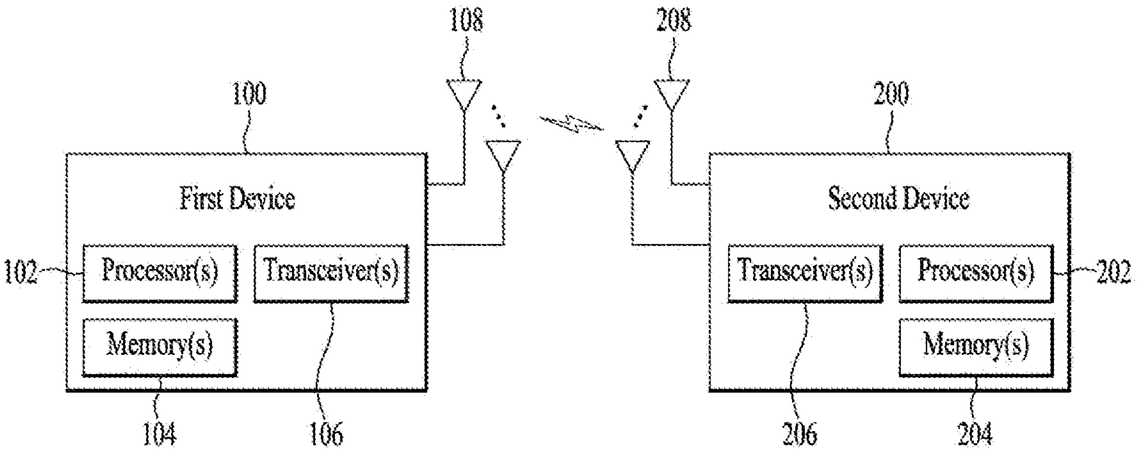
FIG. 22 illustrates exemplary wireless devices to which various embodiments are applicable.

FIG. 22 illustrates exemplary wireless devices to which various embodiments are applicable.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In various embodiments, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In various embodiments, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments, one or more memories (e.g., 104 or 204) may store instructions or programs which, when executed, cause one or more processors operably coupled to the one or more memories to perform operations according to various embodiments or implementations.

According to various embodiments, a computer-readable storage medium may store one or more instructions or computer programs which, when executed by one or more processors, cause the one or more processors to perform operations according to various embodiments or implementations.

According to various embodiments, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations.

Example of Using Wireless Device to which Various Embodiments are Applied

Figure 23:
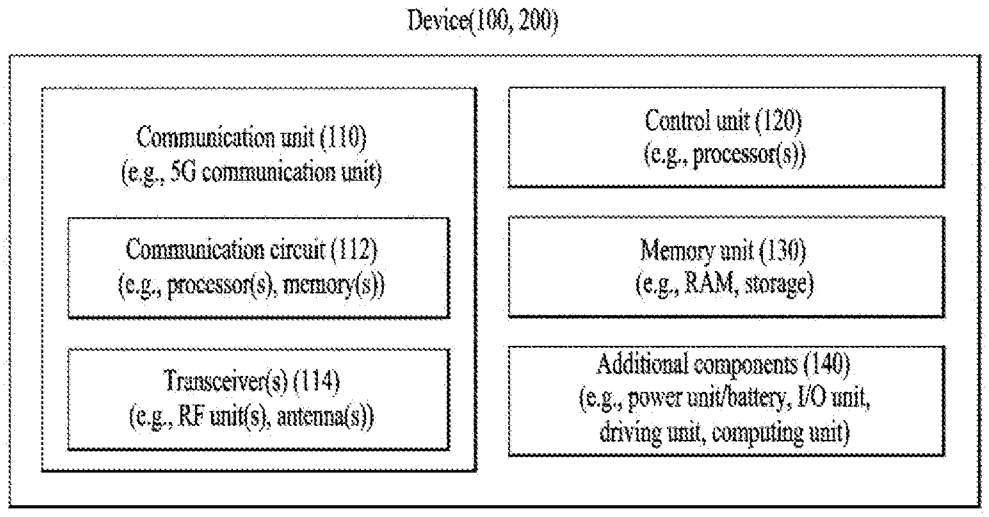
FIG. 23 illustrates other exemplary wireless devices to which various embodiments are applied.

FIG. 23 illustrates other exemplary wireless devices to which various embodiments are applied. The wireless devices may be implemented in various forms according to a use case/service (see FIG. 21).

Referring to FIG. 23, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 21), the vehicles (100*b*-1 and 100*b*-2 of FIG. 21), the XR device (100*c* of FIG. 21), the hand-held device (100*d* of FIG. 21), the home appliance (100*e* of FIG. 21), the IoT device (100*f* of FIG. 21), a digital broadcast terminal, a hologram device, a public safety device, an MTC device, a medicine device, a Fintech device (or a finance device), a security device, a climate/environment device, the AI server/device (400 of FIG. 21), the BSs (200 of FIG. 21), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Example of Portable Device to which Various Embodiments are Applied

Figure 24:
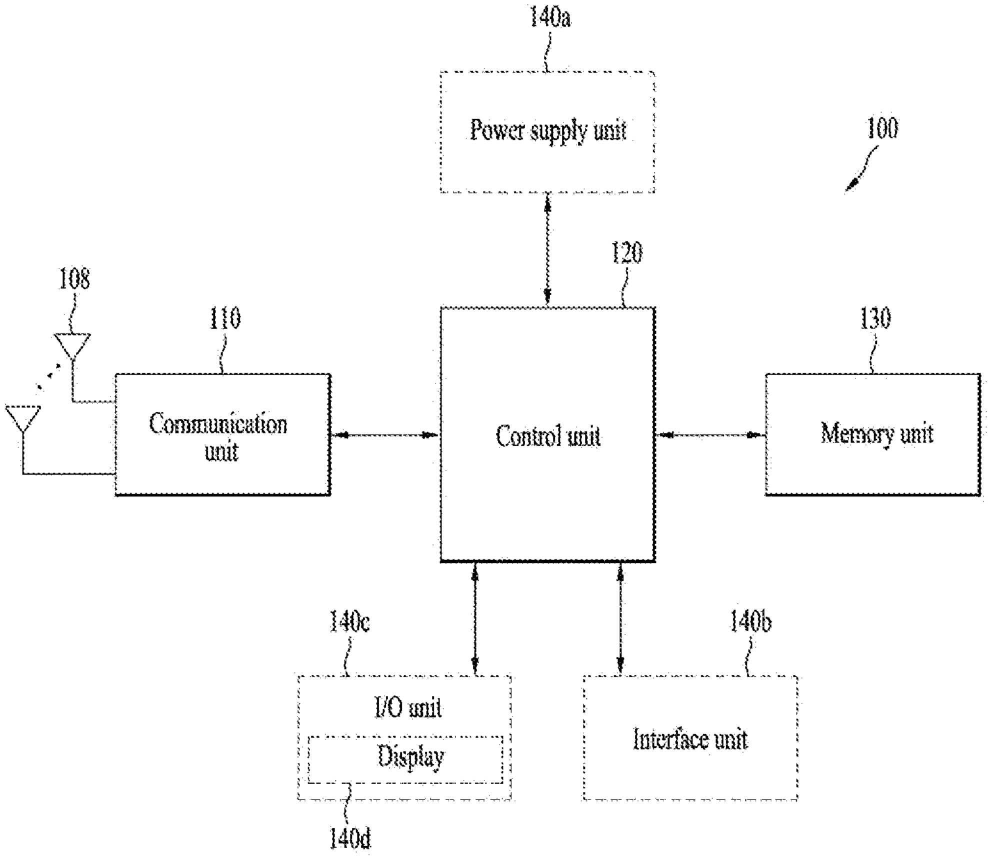
FIG. 24 illustrates an exemplary portable device to which various embodiments are applied.

FIG. 24 illustrates an exemplary portable device to which various embodiments are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 24, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 25:
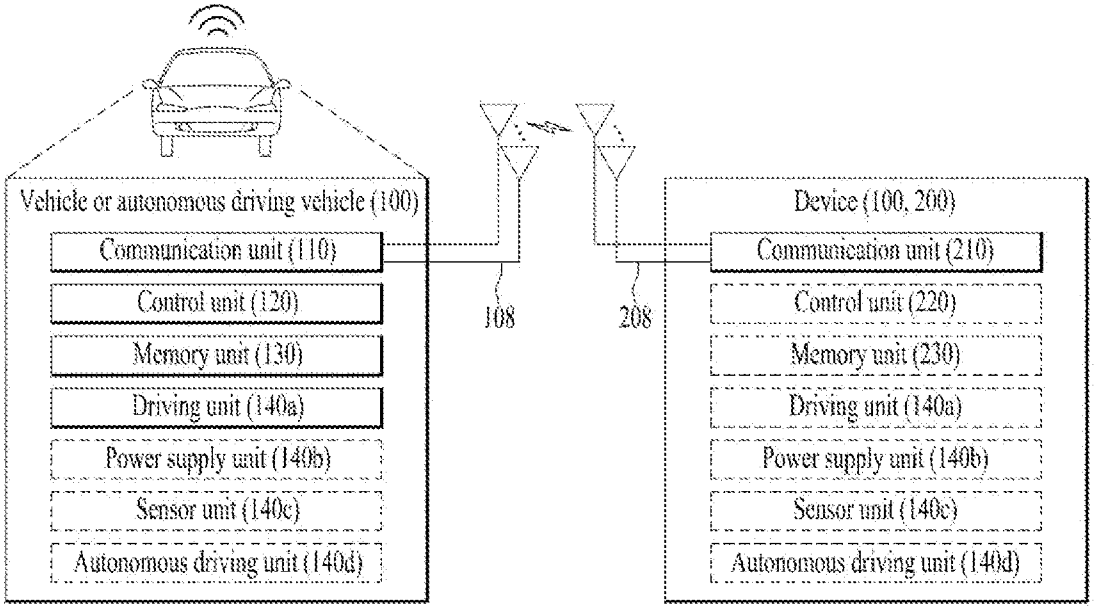
FIG. 25 illustrates an exemplary vehicle or autonomous vehicle to which various embodiments are applied.

Example of Vehicle or Autonomous Driving Vehicle to which Various Embodiments are Applied FIG. 25 illustrates an exemplary vehicle or autonomous driving vehicle to which various embodiments are applied. The vehicle or autonomous driving vehicle may be implemented as a mobile robot, a car, a train, a manned/unmanned aerial vehicle (AV), a ship, or the like.

Referring to FIG. 25, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multimode multi-band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

The wireless communication technology in which various embodiments are implemented may include LTE, NR, and 6G, as well as narrowband Internet of things (NB-IoT) for low power communication. For example, the NB-IoT technology may be an example of low power wide area network (LPWAN) technology and implemented as the standards of LTE category (CAT) NB1 and/or LTE Cat NB2. However, these specific appellations should not be construed as limiting NB-IoT. Additionally or alternatively, the wireless communication technology implemented in a wireless device according to various embodiments may enable communication based on LTE-M. For example, LTE-M may be an example of the LPWAN technology, called various names such as enhanced machine type communication (eMTC). For example, the LTE-M technology may be implemented as, but not limited to, at least one of 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M. Additionally or alternatively, the wireless communication technology implemented in a wireless device according to various embodiments may include, but not limited to, at least one of ZigBee, Bluetooth, or LPWAN in consideration of low power communication. For example, ZigBee may create personal area networks (PANs) related to small/low-power digital communication in conformance to various standards such as IEEE 802.15.4, and may be referred to as various names Various embodiments may be implemented in various means. For example, various embodiments may be implemented in hardware, firmware, software, or a combination thereof.

In a hardware configuration, the methods according to exemplary embodiments may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments may be carried out in other specific ways than those set forth herein without departing from the spirit and essential characteristics of the various embodiments. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment or included as a new claim by a subsequent amendment after the application is filed.

INDUSTRIAL APPLICABILITY

The various embodiments are applicable to various wireless access systems including a 3GPP system, and/or a 3GPP2 system. Besides these wireless access systems, the various embodiments are applicable to all technical fields in which the wireless access systems find their applications. Moreover, the proposed method can also be applied to mmWave communication using an ultra-high frequency band.

The invention claimed is:

1. A method by a user equipment (UE) comprising:

receiving positioning reference signal (PRS) configuration information;

receiving one or more PRSs based on the PRS configuration information, wherein based on reception of information on triggering an aperiodic PRS, the one or more PRSs are aperiodically received;

obtaining a measurement for positioning based on the one or more PRSs;

receiving information for configuring a measurement report via radio resource control (RRC) signaling; and reporting the measurement based on the information for configuring the measurement report, wherein the information for configuring the measurement report comprises information on an identifier for a positioning reporting configuration, information on reporting behavior in a time domain, information on resolution of reporting contents, information on a UE transmission/reception beam or a UE panel, information on the reporting contents, information on a timing error, and information on the one or more PRSs used to obtain the reporting contents.

2. The method of claim 1, wherein the PRS configuration information comprises:

information on positioning frequency layers;

information on a specific transmission and reception point (TRP) among a plurality of first TRPs;

information on PRS resource sets of the specific TRP; and information on PRS resources of the specific TRP, wherein the information on the PRS resource sets of the specific TRP and the information on the PRS resources of the specific TRP are included in a higher layer parameter for assistance data related to the specific TRP, and wherein the higher layer parameter further comprises information for configuring a triggering state of the aperiodic PRS.

3. The method of claim 2, wherein the information on triggering the aperiodic PRS is received in downlink control information (DCI), and wherein the information on triggering the aperiodic PRS is related to the triggering state of the aperiodic PRS configured based on the information for configuring the triggering state of the aperiodic PRS.

4. The method of claim 3, wherein the DCI comprises:

information indicating a specific positioning frequency layer among the positioning frequency layers;

information indicating the specific TRP among the plurality of first TRPs;

information indicating a specific PRS resource set among the PRS resource sets; and information indicating a specific PRS resource among the PRS resources, and wherein the information indicating the specific positioning frequency layer among the positioning frequency layers, the information indicating the specific TRP among the plurality of first TRPs, the information indicating the specific PRS resource set among the PRS resource sets, and the information indicating the specific PRS resource among the PRS resources are indicated by different bit fields, or wherein the information indicating the specific positioning frequency layer among the positioning frequency layers, the information indicating the specific TRP among the plurality of first TRPs, the information indicating the specific PRS resource set among the PRS resource sets, and the information indicating the specific PRS resource among the PRS resources are indicated by one integrated bit field.

5. The method of claim 2, wherein the specific TRP is one of a plurality of second TRPs included in the plurality of first TRPs, and wherein for each of the plurality of second TRPs, an offset for triggering the aperiodic PRS is configured in units of at least one of symbols or slots.

6. A user equipment (UE) comprising:

a transceiver; and at least one processor connected to the transceiver, wherein the at least one processor is configured to:

receive positioning reference signal (PRS) configuration information;

receive one or more PRSs based on the PRS configuration information, wherein based on reception of information on triggering an aperiodic PRS, the one or more PRSs are aperiodically received;

obtain a measurement for positioning based on the one or more PRSs;

receive information for configuring a measurement report via radio resource control (RRC) signaling; and report the measurement based on the information for configuring the measurement report, wherein the information for configuring the measurement report comprises information on an identifier for a positioning reporting configuration, information on reporting behavior in a time domain, information on resolution of reporting contents, information on a UE transmission/reception beam or a UE panel, information on the reporting contents, information on a timing error, and information on the one or more PRSs used to obtain the reporting contents.

7. The UE of claim 6, wherein the PRS configuration information comprises:

information on positioning frequency layers;

information on a specific transmission and reception point (TRP) among a plurality of first TRPs;

information on PRS resource sets of the specific TRP; and information on PRS resources of the specific TRP, wherein the information on the PRS resource sets of the specific TRP and the information on the PRS resources of the specific TRP are included in a higher layer parameter for assistance data related to the specific TRP, and wherein the higher layer parameter further comprises information for configuring a triggering state of the aperiodic PRS.

8. The UE of claim 7, wherein the information on triggering the aperiodic PRS is received in downlink control information (DCI), and wherein the information on triggering the aperiodic PRS is related to the triggering state of the aperiodic PRS configured based on the information for configuring the triggering state of the aperiodic PRS.

9. The UE of claim 7, wherein the specific TRP is one of a plurality of second TRPs included in the plurality of first TRPs, and wherein for each of the plurality of second TRPs, an offset for triggering the aperiodic PRS is configured in units of at least one of symbols or slots.

10. The UE of claim 6, wherein the at least one processor is configured to communicate with at least one of a mobile terminal, a network, or an autonomous vehicle other than a vehicle including the UE.

11. A method by a base station (BS) comprising:

transmitting positioning reference signal (PRS) configuration information;

transmitting one or more PRSs related to the PRS configuration information, wherein based on transmission of information on triggering an aperiodic PRS, the one or more PRSs are aperiodically transmitted;

transmitting, to a user equipment (UE) via radio resource control (RRC) signaling, information for configuring a measurement report; and receiving, from the UE, the measurement report for positioning obtained based on the one or more PRSs, wherein the information for configuring the measurement report comprises information on an identifier for a positioning reporting configuration, information on reporting behavior in a time domain, information on resolution of reporting contents, information on a UE transmission/reception beam or a UE panel, information on the reporting contents, information on a timing error, and information on the one or more PRSs used to obtain the reporting contents.

12. A base station (BS) configured to operate in a wireless communication system, the BS comprising:

a transceiver; and at least one processor connected to the transceiver, wherein the at least one processor is configured to:

transmit positioning reference signal (PRS) configuration information; transmit one or more PRSs related to the PRS configuration information, wherein based on transmission of information on triggering an aperiodic PRS, the one or more PRSs are aperiodically transmitted;

transmit, to a user equipment (UE) via radio resource control (RRC) signaling, information for configuring a measurement report; and receive, from the UE, the measurement report for positioning obtained based on the one or more PRSs, wherein the information for configuring the measurement report comprises information on an identifier for a positioning reporting configuration, information on reporting behavior in a time domain, information on resolution of reporting contents, information on a UE transmission/reception beam or a UE panel, information on the reporting contents, information on a timing error, and information on the one or more PRSs used to obtain the reporting contents.

* * * * *